United States Patent
Rolle et al.

(10) Patent No.: US 12,493,475 B2
(45) Date of Patent: Dec. 9, 2025

(54) LANDSCAPE RECONFIGURATION BASED ON CROSS-SYSTEM DATA STOCKTAKING

(71) Applicant: SAP SE, Walldorf (DE)

(72) Inventors: Benny Rolle, Reinhardshagen (DE); Matthias Vogel, Saarbrücken (DE)

(73) Assignee: SAP SE, Walldorf (DE)

( * ) Notice: Subject to any disclaimer, the term of this patent is extended or adjusted under 35 U.S.C. 154(b) by 72 days.

(21) Appl. No.: 18/487,365

(22) Filed: Oct. 16, 2023

(65) Prior Publication Data

US 2025/0123854 A1 Apr. 17, 2025

(51) Int. Cl.
*G06F 9/445* (2018.01)

(52) U.S. Cl.
CPC ................ *G06F 9/44505* (2013.01)

(58) Field of Classification Search
CPC .. G06F 9/44505; G06F 21/6245; G06F 15/76; G06F 16/95; G06F 21/552; G06F 21/577; G06F 21/554; G06F 21/6218
See application file for complete search history.

(56) References Cited

U.S. PATENT DOCUMENTS

| | | | |
|---|---|---|---|
| 17,186 A | 5/1857 | Atwater | |
| 17,457 A | 6/1857 | Tidgewell | |
| 7,308,704 B2 | 12/2007 | Vogel et al. | |
| 7,350,237 B2 | 3/2008 | Vogel et al. | |
| 8,566,193 B2 | 10/2013 | Singh et al. | |
| 8,874,551 B2 | 10/2014 | Rosjat et al. | |
| 9,149,407 B2 | 10/2015 | Hesse et al. | |
| 9,405,429 B1 | 8/2016 | Gopalakrishnan | |
| 9,569,869 B2 | 2/2017 | Hesse et al. | |
| 9,904,796 B2 | 2/2018 | Pluder et al. | |
| 9,996,592 B2 | 6/2018 | Hengstler et al. | |
| 10,140,453 B1 * | 11/2018 | Fridakis ............... | G06F 21/577 |
| 10,552,642 B2 | 2/2020 | Rolle et al. | |
| 10,839,099 B2 | 11/2020 | Vogel et al. | |
| 10,909,222 B1 | 2/2021 | Fregly et al. | |
| 11,042,654 B2 | 6/2021 | Nos et al. | |
| 11,113,416 B2 * | 9/2021 | Jones ................. | G06F 16/9558 |
| 11,481,513 B2 | 10/2022 | Rolle | |

(Continued)

OTHER PUBLICATIONS

U.S. Appl. No. 18/049,063, filed Oct. 24, 2022, Hesse et al.

(Continued)

*Primary Examiner* — Faisal M Zaman
(74) *Attorney, Agent, or Firm* — Fish & Richardson P.C.

(57) ABSTRACT

The present disclosure involves systems, software, and computer implemented methods for data privacy. One example method includes receiving, from multiple systems in a multi-system landscape, data stocktaking data regarding objects in respective systems. The data stocktaking data comprises, for each respective system, a list of objects under processing in the respective system and a list of objects not under processing in the respective system. The data stocktaking data is evaluated at a central monitoring system to determine at least one misconfiguration of a data privacy integration component that manages data privacy integration in the multi-system landscape. For each identified misconfiguration, a reconfiguration of the data privacy integration component is identified. The identified reconfiguration of the data privacy integration component is applied to correct the misconfiguration.

19 Claims, 14 Drawing Sheets

(56) References Cited

U.S. PATENT DOCUMENTS

| | | | |
|---|---|---|---|
| 11,494,546 B2 | 11/2022 | Rolle | |
| 11,514,065 B2 | 11/2022 | Rolle | |
| 11,550,781 B2 | 1/2023 | Rolle et al. | |
| 11,657,034 B2 | 5/2023 | Rolle | |
| 11,714,828 B2 | 8/2023 | Rolle et al. | |
| 11,714,918 B1* | 8/2023 | Kondal | G06F 21/604 |
| | | | 726/30 |
| 11,741,237 B2 | 8/2023 | Loch et al. | |
| 2008/0174425 A1 | 7/2008 | Torning | |
| 2009/0210394 A1 | 8/2009 | Saravanan et al. | |
| 2009/0288062 A1 | 11/2009 | Lowry et al. | |
| 2012/0036507 A1 | 2/2012 | Jonnala et al. | |
| 2012/0246122 A1 | 9/2012 | Short et al. | |
| 2013/0055278 A1* | 2/2013 | Zaitsev | G06F 12/0253 |
| | | | 718/104 |
| 2013/0347064 A1 | 12/2013 | Aissi | |
| 2014/0059458 A1 | 2/2014 | Levien et al. | |
| 2014/0172496 A1 | 6/2014 | Rosjat et al. | |
| 2014/0267770 A1 | 9/2014 | Gervautz et al. | |
| 2014/0364983 A1 | 12/2014 | Bildmayer et al. | |
| 2015/0113459 A1 | 4/2015 | Hengstler et al. | |
| 2016/0112438 A1 | 4/2016 | Hengstler et al. | |
| 2016/0148143 A1 | 5/2016 | Anderson et al. | |
| 2017/0006135 A1 | 1/2017 | Siebel et al. | |
| 2017/0270163 A1 | 9/2017 | Christoph et al. | |
| 2018/0101164 A1 | 4/2018 | Noetzelmann et al. | |
| 2019/0005210 A1 | 1/2019 | Wiederspohn et al. | |
| 2019/0018985 A1 | 1/2019 | Rolle et al. | |
| 2019/0236334 A1 | 8/2019 | Babushkin | |
| 2020/0012978 A1 | 1/2020 | Brannon et al. | |
| 2020/0019728 A1 | 1/2020 | Rolle | |
| 2020/0117824 A1 | 4/2020 | Upadhyay et al. | |
| 2020/0184087 A1 | 6/2020 | Nos et al. | |
| 2020/0364369 A1 | 11/2020 | Brannon et al. | |
| 2021/0200902 A1 | 7/2021 | Brannon et al. | |
| 2021/0350022 A1 | 11/2021 | Brannon et al. | |
| 2022/0035952 A1 | 2/2022 | Brannon et al. | |
| 2022/0043917 A1 | 2/2022 | Rolle | |
| 2022/0050834 A1 | 2/2022 | Rolle et al. | |
| 2022/0121777 A1 | 4/2022 | Brannon et al. | |
| 2022/0207429 A1 | 6/2022 | Haribhakti et al. | |
| 2022/0277023 A1* | 9/2022 | Rolle | G06Q 30/01 |
| 2022/0277103 A1 | 9/2022 | Brannon et al. | |
| 2022/0357992 A1* | 11/2022 | Karpovsky | G06F 9/52 |
| 2023/0004546 A1 | 1/2023 | Mounidevy et al. | |
| 2023/0081785 A1 | 3/2023 | Zhang | |
| 2023/0086609 A1 | 3/2023 | Grenet et al. | |
| 2023/0176894 A1 | 6/2023 | Rolle et al. | |
| 2023/0177180 A1 | 6/2023 | Rolle | |
| 2023/0177182 A1 | 6/2023 | Rolle et al. | |
| 2023/0177183 A1 | 6/2023 | Rolle et al. | |
| 2023/0177186 A1 | 6/2023 | Ighoroje et al. | |
| 2023/0177187 A1 | 6/2023 | Vogel et al. | |
| 2023/0177188 A1 | 6/2023 | Vogel et al. | |
| 2023/0177189 A1 | 6/2023 | Ighoroje et al. | |
| 2023/0177194 A1 | 6/2023 | Rolle et al. | |
| 2023/0177206 A1 | 6/2023 | Rolle et al. | |
| 2023/0177213 A1* | 6/2023 | Rolle | G06F 16/113 |
| | | | 726/1 |
| 2023/0179602 A1 | 6/2023 | Rolle et al. | |
| 2023/0185938 A1 | 6/2023 | Schmidt et al. | |
| 2023/0214521 A1* | 7/2023 | Amico | G06F 21/6245 |
| | | | 726/1 |
| 2023/0247034 A1 | 8/2023 | Vogel et al. | |
| 2024/0184895 A1* | 6/2024 | Vogel | G06F 21/60 |
| 2024/0356900 A1* | 10/2024 | Wang | H04L 63/0272 |
| 2024/0386106 A1* | 11/2024 | Sethia | G06F 21/577 |
| 2024/0427899 A1 | 12/2024 | Hulick, Jr. et al. | |
| 2025/0013602 A1* | 1/2025 | Hesse | G06F 16/1844 |
| 2025/0013778 A1* | 1/2025 | Rolle | G06F 21/6245 |
| 2025/0124051 A1 | 4/2025 | Rolle et al. | |
| 2025/0124151 A1 | 4/2025 | Vogel | |
| 2025/0124160 A1 | 4/2025 | Rolle et al. | |

OTHER PUBLICATIONS

U.S. Appl. No. 18/073,142, filed Dec. 1, 2022, Rolle.
U.S. Appl. No. 18/073,164, filed Dec. 1, 2022, Rolle et al.
U.S. Appl. No. 18/074,745, filed Dec. 5, 2022, Vogel et al.
U.S. Appl. No. 18/077,476, filed Dec. 8, 2022, Rolle et al.
U.S. Appl. No. 18/077,493, filed Dec. 8, 2022, Rolle et al.
U.S. Appl. No. 18/347,029, filed Jul. 5, 2023, Rolle et al.
U.S. Appl. No. 18/347,065, filed Jul. 5, 2023, Hesse et al.
Sap.com [online], "SAP Master Data Governance" Sep. 2022, retrieved on Oct. 16, 2023, retrieved from URL <https://www.sap.com/products/technology-platform/master-data-governance.html>, 14 pages.
U.S. Appl. No. 18/487,283, Vogel et al., Identifying Forgotten Data Privacy Protocol Relevant Data Objects, filed Oct. 16, 2023, 51 pages.
U.S. Appl. No. 18/487,293, Rolle et al., Automating Handling of Data Subject Requests for Data Privacy Integration Protocols, filed Oct. 16, 2023, 51 pages.
U.S. Appl. No. 18/487,347, Rolle et al., Semantic Responder Dependencies in Integrated End of Purpose Protocols, filed Oct. 16, 2023, 56 pages.
Wikipedia.org [online] "Attribute-value system" created on Oct. 2006, retrieved on Oct. 17, 2023, retrieved from URL <https://en.wikipedia.org/wiki/Attribute%E2%80%93value_system>, 3 pages.
Wikipedia.org [online], "Hash function" created on Sep. 2001, retrieved on Oct. 17, 2023, retrieved from URL <https://en.wikipedia.org/wiki/Hash_function>, 15 pages.
Wikipedia.org [online], "Information privacy" created on May 2003, retrieved on Dec. 6, 2021, retrieved from URL <https://en.wikipedia.org/wiki/Information_privacy>, 7 pages.
Wikipedia.org [online], "Master Data" created on Oct. 2006, retrieved on Dec. 6, 2021, retrieved from URL <https://en.wikipedia.org/wiki/Master_data>, 2 pages.
Wikipedia.org [online], "Personal Data" created on May 2005, retrieved on Dec. 6, 2021, retrieved from URL <https://en.wikipedia.org/wiki/Personal_data>, 7 pages.

\* cited by examiner

LANDSCAPE RECONFIGURATION BASED ON CROSS-SYSTEM DATA STOCKTAKING

TECHNICAL FIELD

The present disclosure relates to computer-implemented methods, software, and systems for cross-system data stocktaking.

BACKGROUND

Applications used for organizations can use master data (such as name and address) and transactional data (such as orders and bills). Transactional data typically references corresponding master data. For instance, a transactional object of type Order can refer to a master data object of type Customer. A given master data object can be referenced by one or more (or perhaps no) transactional objects. In some cases, data may be considered master data in one context and transactional data in another context. For example, insurance contract data may be considered transactional data with respect to a customer object but considered master data with respect to transactional insurance claim data. When an organizational landscape includes multiple systems, a master data replication process can be performed so that master data objects are consistent across systems.

SUMMARY

The present disclosure involves systems, software, and computer implemented methods for data privacy protocols. An example method includes: receiving, from multiple systems in a multi-system landscape, data stocktaking data regarding objects in respective systems, wherein the data stocktaking data comprises, for each respective system, a list of objects under processing in the respective system and a list of objects not under processing in the respective system; evaluating the data stocktaking data at a central monitoring system; determining, based on the evaluating, at least one misconfiguration of a data privacy integration component that manages data privacy integration in the multi-system landscape; for each identified misconfiguration, identifying a reconfiguration of the data privacy integration component; and applying the reconfiguration of the data privacy integration component to correct the misconfiguration.

Implementations can include one or more of the following features. The data stocktaking data is sent by a respective system in response to an event, wherein the event comprises a next periodic interval or a threshold number of objects having been changed in the respective system since a last sending of data stocktaking data by the respective system. Data stocktaking data can include one or more of a last changed date, a predicted end-of-purpose date, or purposes assigned to objects. Data stocktaking data for a respective system can include all objects stored in the respective system or objects that have had a change in status since a last sending of data stocktaking data by the respective system. Data stocktaking data for a respective system can include a list of paused objects that appear to not be under processing in the respective system but are still under processing in the respective system. Identifying the misconfiguration can include: determining that a number of objects in the list of objects not under processing by a first system exceeds a threshold; and determining, as the misconfiguration, that the first system is not configured as a responder for at least one object type in an integrated end-of-purpose protocol. The reconfiguration can include reconfiguring the integrated end-of-purpose protocol so that the first system is a responder for the at least one object type for the integrated end-of-purpose protocol. Identifying the misconfigurations can include determining that a first object has been deleted in a first system but not in a second system. Identifying the misconfiguration can include determining that a first purpose has been disassociated from a first object in a first system but not in a second system based on a misconfiguration in an aligned purpose disassociation protocol. The reconfiguration can include reconfiguring the aligned purpose disassociation protocol to correct the misconfiguration. Identifying the misconfiguration can include determining that a first system has a purpose mapped to a first object but that the first system has not processed the first object for the first purpose in more than a threshold amount of time. Determining a misconfiguration can include automatically determining that the data stocktaking data matches at least one predefined rule. A first rule can specify that the misconfiguration occurs when a first system includes a first object having a first object identifier and a second system does not include any object with the first object identifier after a threshold amount of time after detecting the first object in the first system. A second rule can specify that the misconfiguration occurs when a first object with a first object identifier remains in a first system for more than a threshold amount of time after a second object with the first object identifier has been deleted from a second system. A third rule can specify that the misconfiguration occurs when a first system that is configured to receive data from a second system has more than a threshold different number of objects of a first object type than the second system. A fourth rule can specify that the misconfiguration occurs when a determination is made that a number of objects not under processing in a first system has increased more than a threshold amount during a time period. A fifth rule can specify that the misconfiguration occurs when a determination is made, after a threshold amount of time has passed since modification of first object attributes of a first object instance with a first object identifier in a first system, that second object attributes of a second object instance with the first object identifier in a second system are different than the first object attributes. The misconfiguration can be identified as a misconfiguration of an integration point used to replicate object data and associated purpose information between systems and the reconfiguration can be a reconfiguration of the integration point. Determining that the second object attributes are different than the first object attributes can include comparing a normalized and hashed version of the first object attributes to a normalized and hashed version of the second object attributes. The normalized and hashed version of the first object attributes can be generated by one of the first system, a common library provided to the first system and the second system, a proxy service invoked by the first system, or a web service invoked by the first system. A normalized version of object attributes can be generated based on common normalization rules that specify which and how certain attribute values of an object are to be normalized before hashing of object attribute data occurs. A normalized and hashed version of object attributes can be generated based on applying common hashing rules to normalized object data.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
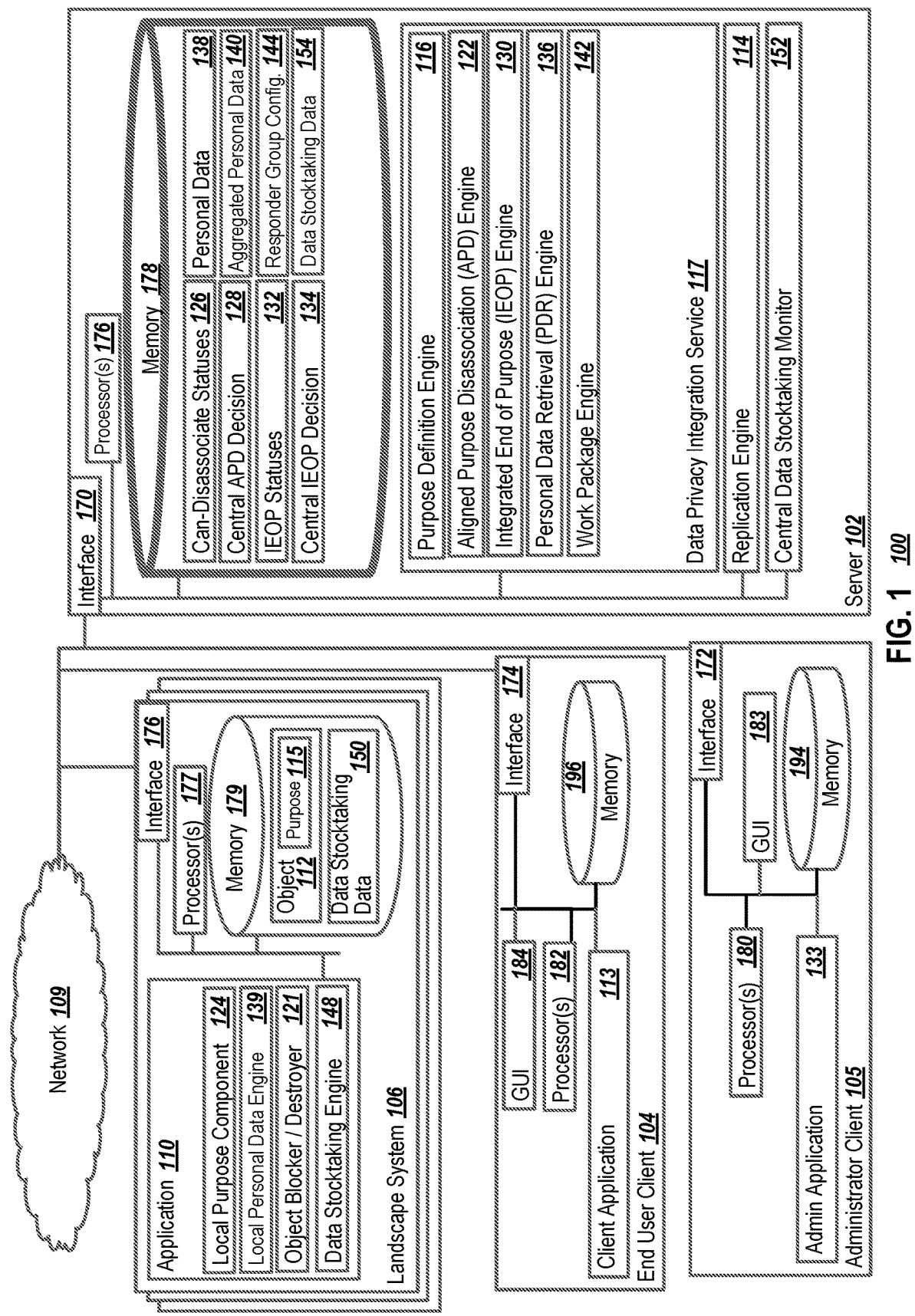
FIG. 1 is a block diagram illustrating an example system for cross-system data stocktaking.

An integrated multiple-application landscape can include a data privacy integration (DPI) service that provides various functions for integrating personal data related capabilities of different applications. For example, the DPI service can include protocols related to integrated end-of-purpose processing, integrated personal data retrieval, aligned purpose disassociation, and other protocols. An integrated end-of-purpose protocol can be used to aligned different applications on a point in time when personal data should be blocked from further processing. An integrated personal data retrieval protocol can be used to manage receiving exports of personal data from various applications, so that a common report including personal data concerning a same data subject (e.g., natural person, individual) from multiple applications can be generated. An aligned purpose disassociation protocol can be used to align various applications on when a purpose assignment is removed from a data object. The various DPI protocols can be used on-premise and/or in cloud environments, and can be designed as asynchronous protocols using asynchronous communication between the DPI service and the various applications.

The integrated end-of-purpose, integrated personal data retrieval, and aligned purpose disassociation protocols are described in more detail in U.S. patent application Ser. No. 17/457,797, filed on Dec. 6, 2021 entitled "INTEGRATED END-OF-PURPOSE PROTOCOL FOR MULTIPLE APPLICATIONS", U.S. patent application Ser. No. 17/457,811, filed on Dec. 6, 2021 entitled "INTEGRATED PERSONAL DATA RETRIEVAL ACROSS MULTIPLE APPLICATIONS", and U.S. patent application Ser. No. 17/457,802, filed on Dec. 6, 2021 entitled "ALIGNED PURPOSE DISASSOCIATION PROTOCOL FOR MULTIPLE APPLICATIONS", respectively, the entire contents of each which are hereby incorporated by reference.

Applications may expend a non-trivial amount of resources responding to requests from the DPI service. Different approaches can be used to reduce resource consumption. For example, applications can be grouped into what can be referred to as responder groups, where the DPI service asks applications in different responder groups, in turn, to respond to a request. Applications can be grouped according to a resource-reduction strategy. For example, applications that are more likely to provide a veto vote (e.g., cannot-block, cannot-disassociate purpose) can be put into earlier responder groups, to reduce a likelihood of other applications unnecessarily performing integrated end-of-purpose or aligned purpose disassociation processing, respectively. Other examples include putting applications that are more likely to fail a block operation in earlier responder groups, or putting applications that are likely to expend more resources responding to a request in a later responder group. Responder groups are described in more detail in U.S. patent application Ser. No. 17/718,770, filed on Apr. 12, 2022 entitled "DATA PRIVACY INTEGRATION SERVICES PROCESSING USING MULTIPLE WORK PACKAGES AND MULTIPLE RESPONDER GROUPS", the entire contents of which are hereby incorporated by reference.

In cloud landscapes, typically many diverse types of data objects are processed, such as master data objects (e.g., data that is referenced by other data) and transactional data objects. Typically, distributed systems have various design goals. For instance, a first goal can be that data should be deleted at certain points in time. For example, the time may be legislated in the case of personal data or, the time may be motivated by a desire to limit stored data to reduce storage. A second design goal can be that in most cases, data objects should be consistent across different systems. A third design goal can be that, in some cases, data objects present in a system should be processed. As another example, a goal can be that if data is not processed by a system, data should not be replicated to that system.

In situations where one or more of these goals are not met, such as in cases of data objects that are never deleted from a system, data objects that are never processed within a system, and/or data objects that are not consistent across system boundaries (e.g., different object attributes for object instances that represent a same semantic object), these situations might indicate potential error(s). However, avoiding and identifying such errors in complex cloud landscapes can be challenging. For instance, cloud applications typically use various different technologies, different architectural approaches, different user interfaces, and different programming languages, among other differences. Additionally, different applications might be managed by different administrators. A challenge can occur to configure all applications in a cloud software landscape in such a way that all data is everywhere where it is required, always available in the right quality but never processed longer as necessary, and deleted at the earliest possible point in time, while also considering that different applications provide varying configuration possibilities.

To overcome the problems described above, a data stocktaking system can collect and provide data inventory information describing the state of data objects across the whole landscape to an administrator and/or to an automated engine. The data inventory information can enable the administrator and/or the automated engine to identify system or application misconfigurations and/or missing configuration settings. The data stocktaking system can identify situations in a software landscape in which some applications are not configured in a consistent way (or in which some applications do not provide configuration possibilities that allow for a consistent configuration across the landscape) because, for instance, some data objects are present in applications in which they are never processed, some data objects are kept longer than necessary, and/or some data objects are inconsistent across multiple applications. The information provided by the data stocktaking system can be used to identify such inconsistencies between data objects and/or application configurations.

As mentioned, some implementations enable the automatic evaluation of data stocktaking data. For example, the data stocktaking data can be analyzed according to configured rules. As another example, changes to collected data can be analyzed over time by data analyzation algorithms (e.g., to determine whether the amount of data objects is growing over time in an application). Automatic analyzing can help administrators be notified of patterns more quickly, as compared to administrator monitoring, so that necessary adjustments to the configuration (e.g., of data replication services such as a master data integration service or data privacy integration protocols, such as integrated end-of-purpose, or aligned purpose association) can be performed more quickly.

After inconsistencies are identified (e.g., by an administrator or by an automated engine), an administrator and/or an automated engine can configure (or reconfigure) one or more applications or systems in the landscape. In particular, configuration of data privacy integration protocols can be performed based on information provided by the data stocktaking system. As another example, data replication configuration settings can be changed.

Configurations made after evaluation of data stocktaking information can therefore result in improvements to various types of systems. Such improvements, that can be made more easily and at an earlier point in time as compared to systems that do not include evaluation of data stocktaking information, may reduce the risk of operating software in a non-compliant manner. For instance, a period in which data processing is not accurate can be reduced as a result of faster identification of inconsistencies. Additionally, deletion of unneeded data objects from storage can save technical resources, such as storage hardware and electricity. As another example, if a determination is made that certain data is never used within a particular system, an administrator or an automated engine may, in response to such a determination, change certain replication settings so that the data will no longer be replicated to the system anymore, thus saving technical resources including storage hardware, electricity, and network bandwidth. In general, by identifying data that can be deleted, the system described herein can reduce cost of data processing and storage. Additionally, the system can also reduce risk of processing data without any legal ground.

The system described herein can identify inconsistencies in both systems that are integrated with a data privacy integration protocol (such as iEoP or APD), systems that are not integrated with a DPI protocol but which block/delete data based on internal determinations, and/or other protocols that involve aligned blocking/deletion. Data stocktaking approaches including system reconfiguration are described in more detail below. In particular, more details are provided below for approaches for identifying inconsistencies between object attributes of object instances, while still maintaining data protection measures for personal data.

FIG. 1 is a block diagram illustrating an example system 100 for integrated data privacy services. Specifically, the illustrated system 100 includes or is communicably coupled with a server 102, an end-user client device 104, an administrator client device 105, landscape systems 106, and a network 108. Although shown separately, in some implementations, functionality of two or more systems or servers may be provided by a single system or server. In some implementations, the functionality of one illustrated system, server, or component may be provided by multiple systems, servers, or components, respectively. For example, the server 102 includes different engines which may or may not be provided by a single system or server. Furthermore, although the system 100 is illustrated as being configured for handling operations for one organization, the server 102 and included components are configured to handle operations for multiple organizations (e.g., in a multi-tenant fashion). For instance, each organization may be a customer of a software provider that provides the server 102 (and other servers) and implementations of component included in the server 102. The software provider can also provide at least some of the landscape systems 106, which can each also have multi-tenant architectures.

The landscape systems 106 can include multiple systems that exist in a multi-system landscape. An organization can use different systems, of different types, to run the organization, for example. Other types of systems can be used to provide services for end users. The landscape systems 106 can include systems from a same vendor (e.g., the software provider mentioned above) or different vendors. The landscape systems 106 can each include at least one application 110 for performing organizational processes and working with organizational data. Organizational data can include master data objects and transactional objects. For example, the application 110 can process a master data object 112. An end user of the organization can use a client application 113 (which may be a client version of the application 110) on the end-user client device 104 to consume and/or interact with landscape data, including information from the master data object 112. Regarding the handling of master data objects, various best practices can be applied by an organization. For example, the system 100 can be configured so that corresponding master data objects are consistent across all landscape systems 106. For instance, a replication engine 114 can distribute master data to at least some of the landscape systems 106 so that each application 110 that acts on certain master data can perform processing on the same consistent master data. As described in more detail below, an administrator of the organization can use the administrator client device 105 to perform various administration and/or configuration tasks to configure the landscape systems 106 and/or other tools included in the server 102 (or other servers or systems).

For example, various data protection rules and laws may require that data is only processed for specified purposes. The system 100 can implement a purpose requirement by associating purpose information with each object instance (or portion of an object instance). For example, a purpose 115 has been associated with the master data object 112. A purpose definition engine 116 can be included in a DPI service 117 to enable customers to define purposes for processing personal data that are relevant for the customer. Defined purposes can be stored as purposes 118.

In some cases and as described in more detail below, a purpose 118 can be associated with data categories 120. An administrator can assign one or more data categories 120 to a purpose 118 to specify which of potentially different attribute sets stored for a data object can be used when data for the purpose 118 is processed. As described in more detail below, a purpose 118 may exist in a purpose hierarchy and may have one or more dependent purposes. Dependent purposes may represent complementary purposes that can allow a more granular differentiation of data protection measures such as different retention and deletion rules (and other aspects), as compared to a parent purpose. For instance, a parent purpose such as contractual pay for employee work may have a dependent purpose such as tax audit. Processing under the tax audit dependent purpose may use a subset of data (e.g., a subset of data categories) than used for the parent contractual pay purpose and may have a longer retention period. Accordingly, the object blocker/destroyer can destroy object data (e.g., portions of object data) at different times according to different retention periods as configured for different purposes in a purpose hierarchy.

The landscape system 106 can receive the master data object 112 and the associated purpose 115 from the replication engine 114, for example. The DPI service 117 can determine which applications process objects for which purposes. The replication engine 114 can replicate an object with an assigned purpose to a given landscape system 106 when the landscape system 106 processes objects for that purpose. Purpose-based processing can be performed in the landscape system 106, as described in more detail below.

Objects that no longer have any associated productive purposes can be put into a blocked state for a period of time, in accordance with one or more non-productive purposes, for instance by an object blocker/destroyer 121, before being deleted. For instance, while an object instance with no attached purposes may no longer be used for transactions or have any need to be accessed by production systems, the object can be maintained, in a blocked state, for a certain number of days or years, to enable auditing, for example. An authorized service, such as an audit service, may be enabled to access the blocked object, but other production applications or services can be prevented from accessing the blocked object. As another example, for an application that provides both productive functionality and audit functionality, the audit portion of the application can access blocked data but the productive portion of the application cannot access blocked data.

As part of an aligned disassociation approach, the landscape systems 106 can disassociate a purpose with an object in response to information received from an aligned purpose disassociation engine 122 of the DPI service 117, rather than solely based on a local decision. For example, each landscape system 106 can provide information to the aligned purpose disassociation engine 122. For example, a local purpose component 124 in each landscape system 106 can determine, for each purpose of an object, whether the purpose can be locally disassociated from the object. In some cases, the local purpose component 124 can determine, without consulting other systems, whether a purpose can be locally disassociated from the object. In other cases, the local purpose component 124 may consult other system(s) when performing the local check. For example, if a first system is integrated with a second system and exchanges data with the second system, but the second system is not integrated with the APD protocol, the first system may contact the second system and consider the status of the second system as part of a local status of the first system for the APD protocol. As another example, the second system may be integrated with the APD protocol but the first system may know that specific circumstances within the second system are relevant for the local status of the first system. For example, the first system may know that a purpose that cannot be disassociated from data within the second system may result in the purpose not being able to be disassociated in the first system. As an example, suppose the first system collects expense information that is transferred to the second system and posted as financial data in the second system. The first system may be integrated with the second system (e.g., before the systems became integrated with the APD protocol) in such a way that the first system can ask the second system whether a purpose can be disassociated from the data.

For example, each landscape system 106 can determine a "can-disassociate" status for a requested purpose and object. A can-disassociate status for a respective landscape system 106 can be either an affirmative can-disassociate status that indicates that the landscape system 106 can disassociate a purpose from an object or a negative can-disassociate status that indicates that the landscape system 106 cannot disassociate the purpose from the object. The aligned purpose disassociation engine 122 can collect received can-disassociate statuses 126. The aligned purpose disassociation engine 122 can evaluate the can-disassociate statuses 126 to determine a central aligned disassociate purpose decision 128 regarding disassociating a purpose from an object. The aligned purpose disassociation engine 122 can determine that the central aligned disassociate purpose decision 128 is to disassociate the purpose from the object if no landscape system 106 is unable to disassociate the purpose from the object. The aligned purpose disassociation engine 122 can determine that the central aligned disassociate purpose decision 128 is to not disassociate the purpose from the object if at least one landscape system 106 is unable to disassociate the purpose from the object. The aligned purpose disassociation engine 122 can provide the central aligned disassociate purpose decision 128 to each landscape system 106. The local purpose component 124 can disassociate the purpose from the object in response to receiving the central aligned disassociate purpose decision 128, if the central aligned disassociate purpose decision 128 is in fact to disassociate the purpose from the object.

The object blocker/destroyer 121 can block an object (e.g., from all production processing) when no productive purposes are associated with the object (e.g., after all productive purposes have been disassociated), according to one or more retention policies. An object can be blocked, rather than destroyed, if one or more retention policies associated with one or more non-productive purposes state that the object is to be maintained for access, outside of productive processing, only by authorized users. The object blocker/destroyer 121 can determine to destroy a blocked object in response to determining that all applicable retention reasons have expired. Object destruction decisions and actions can occur locally and independently in each landscape system 106. For example, each application 110 can determine locally whether a blocked object is to be destroyed. For instance, the application 110 can determine to destroy an object (e.g., a master data object) when no purposes are associated with the object, no transactional data references the object, and no retention policy currently applies to the object. In response to an object destruction decision, the object blocker/destroyer 121 can destroy the object. As described below, object blocking can be aligned across systems, so that, e.g. master data is blocked in all systems at substantially a same point in time to ensure that a first system does not create new transactional data referencing the master data where the new transactional data is replicated to a second system in which the master data had already been blocked.

In some implementations, an iEoP (Integrated End-of-Purpose) engine 130 of the DPI service 117 is used instead of or in addition to the APD engine 122. The iEoP engine 130 can send EoP queries to each landscape system 106 and receive EoP statuses 132 from the local purpose components 124 of different landscape systems regarding ability to block or delete a particular master data object. The iEoP engine 130 can evaluate the EoP statuses 132 to generate a central EOP decision 134. If a consensus is reached regarding ability to block an object, the iEoP engine 130 can distribute aligned block commands to trigger an aligned blocking of the object across the landscape systems 106. The iEoP engine 130 can also orchestrate integrated unblocking, when unblocking is required due to blocking failure in one or more systems, or for other reasons.

As mentioned, a data subject can have a right to request personal data stored associated with the data subject. The data subject (or the data controller, on behalf of the data subject) can initiate a personal data request from any of the landscape systems 106. For example, the data subject may submit a request using a user interface of the client application 113, with the request being received by the application 110 that handles requests from the client application 113. The application 110 can forward the request to a personal data retrieval engine 136 of the DPI service 117. Accordingly, any application within the landscape that is integrated with the DPI service 117 can request a report that, when generated, includes personal data automatically obtained by the DPI service from all of the other applications in the landscape. The data subject, therefore, can trigger a personal data request, in any one of the applications, rather than having to request from all of the applications. The PDR engine 136 automatically requests and receives personal data 138 from respective local personal data engines 139 in different landscape systems 106. The PDR engine 136 then creates aggregated personal data 140 and provides the aggregated personal data 140 to the data subject in response to the request, as a unified and uniform data report. In addition to the APD engine 122, the iEoP engine 130, and the PDR engine 136, the DPI service 117 can include or provide other data privacy integration services.

A work package engine 142 can be used to split requests into multiple work packages. As mentioned above, the DPI service 117 can send requests (e.g., work packages) to applications according to responder group configurations 144.

As part of a landscape data stocktaking approach, a data stocktaking engine 148 in each landscape system 106 can create or retrieve (e.g., per object type) data stocktaking data 150 that can include, for example, object lists with additional attribute(s) per object that can be used to indicate status of the object in the landscape system 106. Status values can indicate, for example, whether the object is in use or no longer used. In some implementations, status values can also indicate a paused status of an object (e.g., which can indicate that the object looks like it is not under processing but it is actually under processing). Paused objects are described in more detail below.

As such, the data stocktaking data 150 can include "objects in process," "object not in process," (and in some implementations "paused objects") lists, with such information determined from the perspective of the respective landscape system 106. Additionally, and as described in more detail below with respect to FIGS. 3 to 7, the data stocktaking data can include normalized and hashed object attribute data for detecting inconsistencies between object instances in different systems that should be consistent. Although shown as being stored in the landscape system 106, the data stocktaking data 150 can be generated on demand in response to a request or as part of scheduled processing. Each landscape system 106 can provide respective data stocktaking data 150 for the landscape system 106 to a central data stocktaking monitor 152 (which can be implemented, for example, in the server 102 or in another server or system). Received sets of data stocktaking data from respective systems can be centrally stored (or otherwise stored) as data stocktaking data 154.

As described in more detail below, evaluation of the data stocktaking data 154 can result in identification of misconfiguration(s) in one or more of the APD engine 122, the iEoP engine 130, or the replication engine 114. In response to the identified misconfiguration(s), one or more reconfigurations can be performed with respect to the APD engine 122, the iEoP engine 130, or the replication engine 114.

As used in the present disclosure, the term "computer" is intended to encompass any suitable processing device. For example, although FIG. 1 illustrates a single server 102, a single end-user client device 104, a single administrator client device 105, the system 100 can be implemented using a single, stand-alone computing device, two or more servers 102, or multiple client devices. Indeed, the server 102 and the client devices 104 and 105 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client devices 104 and 105 may be adapted to execute any operating system or runtime environment, including Linux, UNIX, Windows, Mac OS®, Java™, Android™, iOS, BSD (Berkeley Software Distribution) or any other suitable operating system. According to one implementation, the server 102 may also include or be communicably coupled with an email server, a Web server, a caching server, a streaming data server, and/or other suitable server.

Interfaces 170, 172, 173, and 174 are used by the server 102, the end-user client device 104, the landscape system 106, and the administrator client device 105, respectively, for communicating with other systems in a distributed environment—including within the system 100—connected to the network 108. Generally, the interfaces 170, 172, 173, and 174 each comprise logic encoded in software and/or hardware in a suitable combination and operable to communicate with the network 108. More specifically, the interfaces 170, 172, 173, and 174 may each comprise software supporting one or more communication protocols associated with communications such that the network 108 or interface's hardware is operable to communicate physical signals within and outside of the illustrated system 100.

The server 102 includes one or more processors 176. Each processor 176 may be a central processing unit (CPU), a blade, an application specific integrated circuit (ASIC), a field-programmable gate array (FPGA), or another suitable component. Generally, each processor 176 executes instructions and manipulates data to perform the operations of the server 102. Specifically, each processor 176 executes the functionality required to receive and respond to requests from the end-user client device 104, for example. Similarly, each landscape system 106 includes one or more processors 177. Each processor 177. Each processor 177 executes instructions and manipulates data to perform the operations of the respective landscape system 106.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, ABAP (Advanced Business Application Programming), ABAP OO (Object Oriented), any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 178. In some implementations, the server 102 includes multiple memories. The memory 178 may include any type of memory or database module and may take the form of volatile and/or non-volatile memory including, without limitation, magnetic media, optical media, random access memory (RAM), read-only memory (ROM), removable media, or any other suitable local or remote memory component. The memory 178 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102. Similarly, each landscape system 106 includes memory 179. The memory 179 may store various objects or data associated with the purposes of the landscape system 106.

The end-user client device 104 and the administrator client device 105 may each be any computing device operable to connect to or communicate in the network(s) 108 using a wireline or wireless connection. In general, each of the end-user client device 104 and the administrator client device 105 comprises an electronic computer device operable to receive, transmit, process, and store any appropriate data associated with the system 100 of FIG. 1. Each of the end-user client device 104 and the administrator client device 105 can include one or more client applications, including the client application 113 or an administrative application 133, respectively. A client application is any type of application that allows a client device to request and view content on the client device. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 and the administrator client device 105 respectively include processor(s) 180 or processor(s) 182. Each processor 180 or 182 included in the end-user client device 104 or the administrator client device 105 may be a central processing unit (CPU), an application specific integrated circuit (ASIC), a field-programmable gate array (FPGA), or another suitable component. Generally, each processor 180 or 182 included in the end-user client device 104 or the administrator client device 105 executes instructions and manipulates data to perform the operations of the end-user client device 104 or the administrator client device 105, respectively. Specifically, each processor 180 or 182 included in the end-user client device 104 or the administrator client device 105 executes the functionality required to send requests to the server 102 and to receive and process responses from the server 102.

Each of the end-user client device 104 and the administrator client device 105 is generally intended to encompass any client computing device such as a laptop/notebook computer, wireless data port, smart phone, personal data assistant (PDA), tablet computing device, one or more processors within these devices, or any other suitable processing device. For example, the end-user client device 104 and/or the administrator client device 105 may comprise a computer that includes an input device, such as a keypad, touch screen, or other device that can accept user information, and an output device that conveys information associated with the operation of the server 102, or the client device itself, including digital data, visual information, or a GUI 183 or a GUI 184, respectively.

The GUI 183 and the GUI 184 each interface with at least a portion of the system 100 for any suitable purpose, including generating a visual representation of the client application 113 or the administrative application 133, respectively. In particular, the GUI 183 and the GUI 184 may each be used to view and navigate various Web pages. Generally, the GUI 183 and the GUI 184 each provide the user with an efficient and user-friendly presentation of business data provided by or communicated within the system. The GUI 183 and the GUI 184 may each comprise a plurality of customizable frames or views having interactive fields, pull-down lists, and buttons operated by the user. The GUI 183 and the GUI 184 each contemplate any suitable graphical user interface, such as a combination of a generic web browser, intelligent engine, and command line interface (CLI) that processes information and efficiently presents the results to the user visually.

Memory 194 and memory 196 respectively included in the end-user client device 104 or the administrator client device 105 may each include any memory or database module and may take the form of volatile or non-volatile memory including, without limitation, magnetic media, optical media, random access memory (RAM), read-only memory (ROM), removable media, or any other suitable local or remote memory component. The memory 194 and the memory 196 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the respective client device.

There may be any number of end-user client devices 104 and administrative client devices 105 associated with, or external to, the system 100. Additionally, there may also be one or more additional client devices external to the illustrated portion of system 100 that are capable of interacting with the system 100 via the network(s) 108. Further, the term "client," "client device," and "user" may be used interchangeably as appropriate without departing from the scope of this disclosure. Moreover, while client device may be described in terms of being used by a single user, this disclosure contemplates that many users may use one computer, or that one user may use multiple computers.

Figure 2:
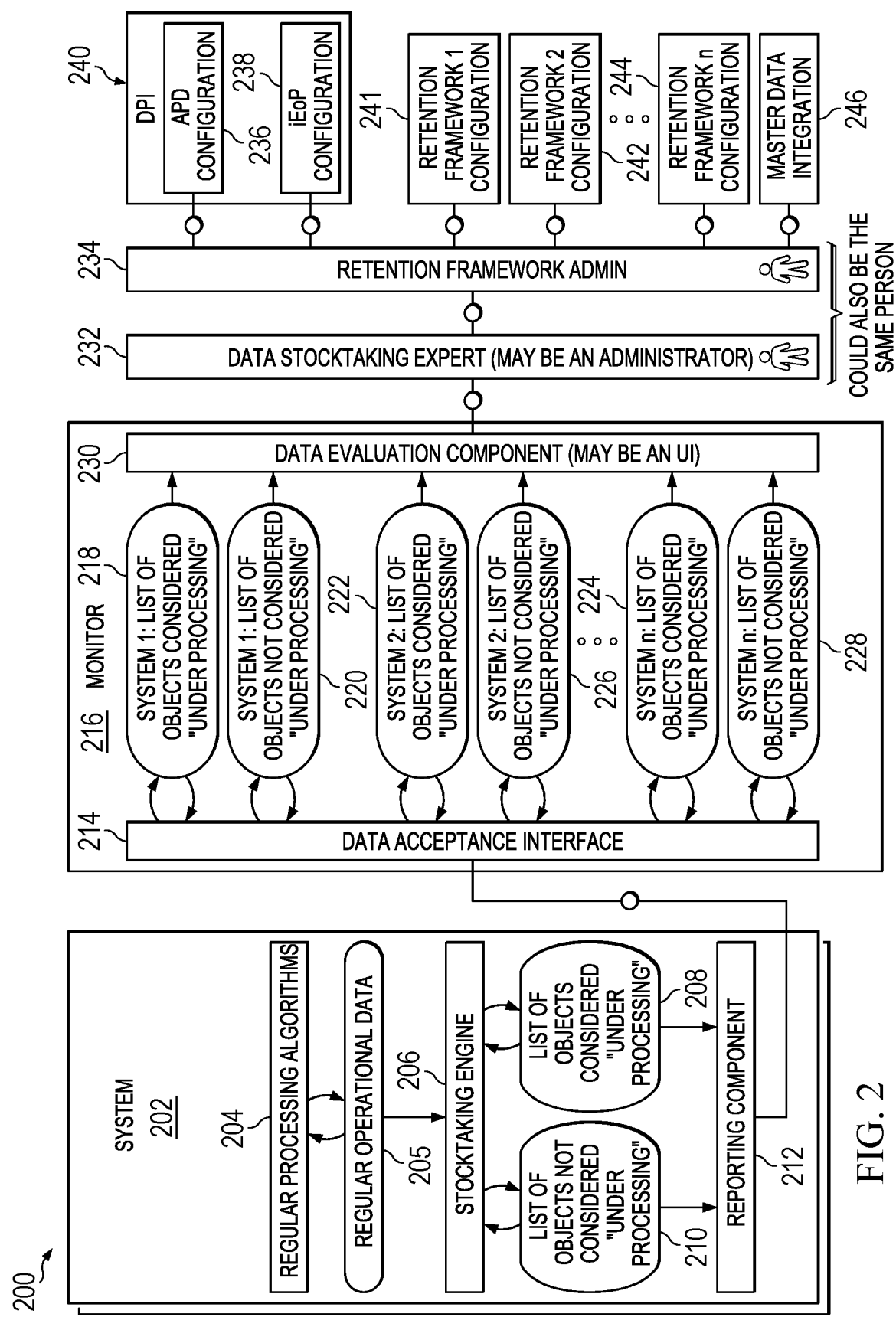
FIG. 2 illustrates an example system for evaluation of data stocktaking information.

FIG. 2 illustrates an example system 200 for evaluation of data stocktaking information. A landscape system 202 (which, in some instances, can be the landscape system 106 described above with respect to FIG. 1) can perform data stocktaking operations. The landscape system 202 is one landscape system among a plurality of landscape systems. Other landscape systems can perform similar processing.

Regular processing algorithms 204 can be performed in or by the landscape system 202, during regular operations of the landscape system 202. The execution of the regular processing algorithms 204 can generate (and/or access) regular operational data 205. Regular operational data 205 may be distinguished from data stocktaking data. For example, a stocktaking engine 206 can generate data stocktaking data that can include, for example, a list 208 of objects that are considered as under processing and a list 210 of objects that are not considered under processing.

In some implementations, a third list is generated or maintained of objects that are considered as paused objects. In other implementations, the stocktaking engine resolves paused objects to either an under-processing or not-under-processing status, and includes the formerly paused object in either the list 208 or the list 210. As an example of resolution of a paused object, an object that has not been processed in the last six months but which has an open delivery date might be initially classified as a paused object (because it may be considered than eventual delivery may occur). However, if the object remains as unchanged for a longer period of time, such as for more than one year, then the status of the object may be resolved (e.g., either automatically or from an auditor review) from paused to not under processing, for example, based on an assumption that a delivery may not ever occur (e.g., a customer may no longer be reachable, the object may have been created in error, etc.).

The data stocktaking data (e.g., objects in the list 208 and the list 210) generated/maintained by the stocktaking engine 206 can be provided to a reporting component 212. The reporting component 212 can be configured to provide the data stocktaking data received from the stocktaking engine 206 to a data acceptance interface 214 of a central monitor 216 (which can be the central data stocktaking monitor 152 described above with respect to FIG. 1).

The landscape system 202 (and other landscape systems) can report data stocktaking data to the central monitor 216 on a regular basis. The reporting component 212 can either send delta information (e.g., data changed since a last sending of data stocktaking data) or can send a complete set of data stocktaking data (e.g., the entire list 208 and the entire list 210) at each sending of data stocktaking data. The reporting component 212 can send data to the central monitor 216 on a periodic basis (e.g., daily, weekly, etc.), or upon data stocktaking data being changed in the landscape system 202. Sending data upon every change might be resource intensive in some cases, so in some implementations data may be sent after a threshold number (e.g., one hundred) of objects have a changed status, for example.

Different approaches can be used for sending data from the reporting component 212 to the data acceptance interface 214. For example, the reporting component 212 can push data to the data acceptance interface 214, the data acceptance interface 214 can pull data from the reporting component 212, either component may invoke an API call of the other component, or an event infrastructure or mechanism may be used. In some cases, an administrator of either the landscape system 202 or the central monitor 216 can manually trigger a push or pull of data stocktaking data, respectively.

In some implementations, the stocktaking engine 206 includes, in the list 208 and the list 210, last change date information and/or the end of processing date (which can be a predicted date into the future). The end of processing date can correspond to an end-of-purpose date for an object. In some systems, a last change date corresponds to a last accessed date rather than an actual change of object state. A last access date may correspond to a change in metadata for an object, for example (e.g., where the metadata has been updated to reflect a date of last access of the object). In some cases, the central monitor 216 can use or evaluate the last change date information and/or the end of processing information to confirm or adjust in-process, paused, not-in-process status of objects. In some implementations, in which the regular operational data 205 is associated with purposes, the list 208 and the list 210 can include information about which data objects are associated with which purposes. In some cases, the list 208 and the list 210 are organized on a per-purpose, per-object basis.

In some implementations, such as when the central monitor 216 receives full lists (rather than delta lists) from landscape systems, the central monitor 216 compares a new report to a previous report to identify differences between consecutive reports. The central monitor 216 can maintain, in a historical log, each list each landscape system 202 submits. The central monitor 216 can also store, per object, a list of object status modifications that occur for the object over time.

In some implementations, data stocktaking data for an object includes status information for one or more predecessor objects. For instance, for an example process, the following objects may be created during execution of the process: inquiry, quote, order, invoice, invoice reminder, etc. The status for an object can include status information for, or a reference to, one or more predecessor objects. In some cases, the central monitor 216 can determine, derive, or adjust a status of an object (e.g., in process, paused, not in process), based on predecessor object information.

After receiving and possibly adjusting object lists from landscape systems, the central monitor 216 can have different sets of object lists from different systems. For example, the central monitor 216 can have a list 218 from a first system (e.g., the landscape system 202) of objects that are considered as under processing, a list 220 from the first system of objects that are considered as not under processing, and similar in-process lists 222 and 224 and not-in-process lists 226 and 228 from a second system and yet another system, respectively. As discussed, the object lists for a system may include a list of paused objects (or those paused objects may have already been resolved to either in-process or not-in-process objects).

The data stocktaking information (e.g., object lists) in the central monitor 216 can be provided to a data evaluation component 230. The data evaluation component 230 can be an automated engine, as described in more detail below, or can include, for instance, a user interface that enables a data stocktaking expert 232 (which may be an administrator) and/or a retention framework administrator 234 to enable the data stocktaking expert 232 and the retention framework administrator 234 (who may be the same or different users) to evaluate the data stocktaking information.

The data stocktaking expert 232 and/or the retention framework administrator 234 can evaluate the data stocktaking information (e.g., the "not under processing" lists) on a regular basis to determine, for example, whether any systems have a substantial number of objects that that are not deleted but also not processed in the system. As another example, in implementations where object lists include "last processed on" information, the data stocktaking expert 232 and/or the retention framework administrator 234 can evaluate the "last processed on" information as part of determining whether any systems have data that has not been used for a substantial amount of time and that has not been deleted. When data stocktaking information includes information about paused objects, the data stocktaking expert 232 and/or the retention framework administrator 234 can determine whether certain objects have been paused for more than a predefined amount of time.

The data stocktaking expert 232 may, based on insights obtained using the data evaluation component 230, determine to change APD configuration settings 236 and/or iEoP configuration settings 238 of a DPI service 240. As another example, the retention framework administrator 234 may determine to change first retention framework configuration settings 241, second retention framework configuration settings 242, and/or third retention framework configuration settings 244, of first, second, and third retention frameworks, respectively. In some cases, the two administrators convene and discuss considerations or conclusions from insights obtained using the data evaluation component 230. As one example, one or both administrators may determine that one landscape system (e.g., the landscape system 202 or another system) does not appear to delete objects of a certain type. The data stocktaking expert 232 may determine, for example, that the landscape system is not configured as a responder for the iEoP protocol for the blocking phase for that object type. As such, the system would not get a block instruction as part of the iEoP protocol. To resolve such an issue, the iEoP configuration settings 238 can be modified to configure the system as a responder for the iEoP blocking phase for the object type.

When the central monitor 216 maintains historical lists of objects from respective landscape systems, the data evaluation component 230 can be used (e.g., by an administrator or in an automatic fashion) to determine discrepancies. For instance, the data evaluation component 230 can be used to determine that a first system reported, at a first point in time, a first object (e.g., as either under processing or not under processing), and also reported, at a second point in time, object lists that did not include the first object (e.g., based on the first object having been removed in the first system). The data evaluation component 230 can be used to detect a discrepancy, such as a second system still including the first object in a report to the central monitor 216, at or near the second point in time (e.g., indicating that the second system has not removed the first object, thereby creating an inconsistent state in the landscape). The data stocktaking expert 232 can identify a misconfiguration of the iEoP protocol and identify and apply change in the iEoP configuration 238 to correct the misconfiguration.

As another example, when the data stocktaking data from landscape systems is organized (or evaluated) on a per-purpose, per-object basis, the data evaluation component can be used to determine that at a first point in time, both a first system and a second system have a first purpose associated with a first object, but that at a second point in time, the first system no longer has the first purpose associated with the first object, but the second system still has the first purpose associated with the first object (e.g., thus indicating a misconfiguration in the APD protocol). The data stocktaking expert 232 can identify a misconfiguration of the APD protocol and identify and apply a change in the APD configuration settings 236 to correct the misconfiguration. As another example, the data evaluation component 230 can be used to determine that a first system has a first purpose mapped to a first object but that the first system has not processed the first object for the first purpose in more than a threshold amount of time. The data stocktaking expert 232 may evaluate this discrepancy and take one or more actions, such as triggering the APD protocol for the first object (which may result in a landscape consensus to remove the first purpose from the first object).

As another example, when landscape systems include last-updated-on information, data received by the central monitor 216 may indicate that objects were updated in some systems but not in other systems. Accordingly, the data evaluation component 230 can be used to trigger administrators to check data distribution configurations, such as in a Master Data Integration (MDI) engine 246, for example.

Different approaches can be used by the central monitor 216 to adhere to data protection requirements regarding data received by the central monitor 216 from landscape systems. For instance, a DRM (Data Retention Manager) system may be used to trigger deletion of old objects lists that are older than a certain date. That is, the DRM system can be used as retention framework to manage storing of object lists only for a certain period of time. As another example, the central monitor 216 may pseudonymize object identifiers before an identifier is viewed by either the data stocktaking expert 232 or the retention framework administrator 234. As yet another example, landscape systems may use a same cryptographic hash function to pseudonymize every master data object identifier before the central monitor 216 receives a master data object identifier (and thus every same master data object identifier can be pseudonymized in a same manner even from different landscape systems).

Although some administrator examples are discussed above, the data evaluation component 230, as mentioned, may be an automated component that automatically identifies and changes configuration settings of the DPI service 240 or one or more retention frameworks. Automatic configuration and reconfiguration is described in more detail below with respect to FIGS. 8 to 12.

Figure 3:
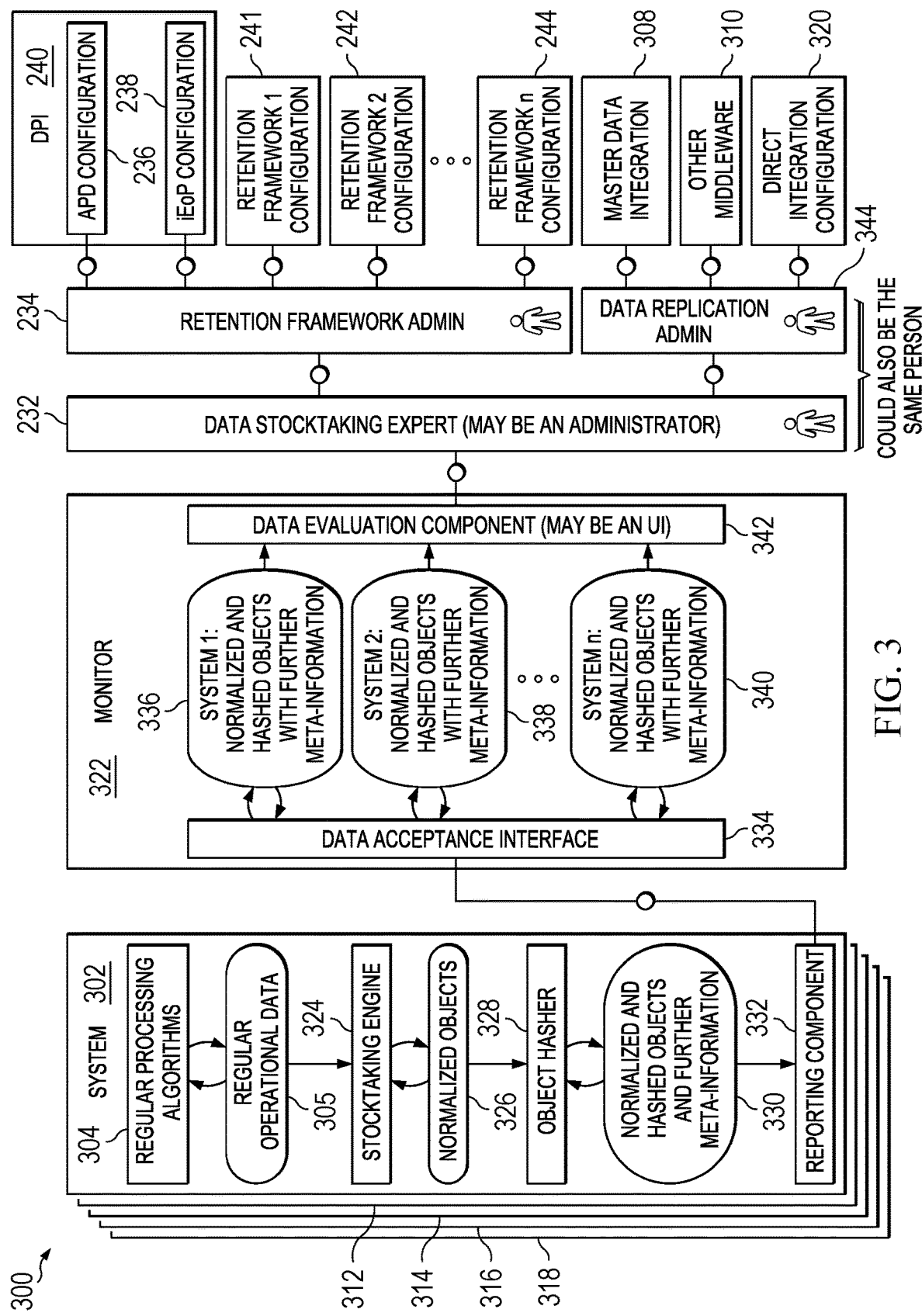
FIG. 3 illustrates an example system for determining inconsistencies in object attributes between systems.

FIG. 3 illustrates an example system 300 for determining inconsistencies in object attributes between systems. A landscape system 302 (which can be the landscape system 106 described above with respect to FIG. 1) can perform data stocktaking operations. The landscape system 302 is one landscape system among a plurality of landscape systems. Other landscape systems can perform similar processing. Similar to the landscape system 202, regular processing algorithms 304 of the landscape system 302 can be performed in or by the landscape system 302, during regular operations of the landscape system 302. The execution of the regular processing algorithms 304 can generate (and/or access), regular operational data 305. Regular operational data 305 may be distinguished from data stocktaking data.

A data stocktaking solution (e.g., such as shown in FIG. 2) that deals with a question of which object is available in which system doesn't, however, identify inconsistencies in object attributes between systems. For instance, with respect to FIG. 3, in an example scenario, some systems may be connected to a master data integration service 308 and receive updates from the MDI service 308 (e.g., as downstream systems), while other systems in the same landscape are not integrated with the MDI service 308, but via some other middleware 310 or via direct integration with another application that is connected to another application, etc. For example, the system 302 can be an upstream system for the MDI service 308, a system 312 can be a downstream system for the MDI service 308, the system 312 may replicate data to the other middleware 310, the other middleware 310 may replicate data to a system 314 and a system 316, and the system 314 may replicate data directly to a system 318 (e.g., based on some direct integration configurations 320).

In this example scenario, it may be desirable to determine or confirm whether the correct and latest state of objects in the regular operational data 305 is redistributed to all relevant systems, including updates to the attributes of these objects. For instance, a landscape's state may become inconsistent in a scenario such as this example scenario that involves multiple integration edges. For instance, one of the integration edges may be misconfigured which may cause a result in that updates to object attributes (or object creations or deletions) are replicated with a delay or not replicated at all.

Inconsistencies between object attributes in different systems could technically be accomplished by each system sending full objects (e.g., all attribute values) as data stocktaking data. However, such an approach might not be legally allowed (e.g., in the case of personal data, whether a purpose of checking object consistency is compatible with a purpose for which the data was originally collected). Additionally, sending full object states would introduce a security risk in that a motivation for a malicious hacker may increase if a monitor 322 holds all operational data include all object attributes from all systems. Furthermore, transferring full objects to the monitor 322 may incur substantial network and computer resource usage. A preferred solution described below can introduce an enhancement to a stocktaking system so that misconfigurations (e.g., of integration edges of data replication services or functionalities) can be identified without replication, to the monitor 322, of full details of all data objects in all systems.

For example, a stocktaking engine 324 can be configured to generate normalized objects 326 from the regular operational data 305 and use an object hasher 328 to generate normalized and hashed objects 330 to be sent to the monitor 322. Accordingly, the system 302 (and other systems) do not send whole objects as plain copy, but rather calculate hash values of normalized object attributes (e.g., on an attribute level) and send those normalized and hashed objects 330 to the monitor 322. In some implementations, the normalized and hashed objects 330 can include, per object, an indication of whether the object is under processing (e.g., for similar in-use or not-in-use analysis as described above with respect to FIG. 2).

The object hasher 328, for example, can serialize the normalized objects and then hash the serialized and normalized object data. The stocktaking engine 324 can normalize objects to ensure that same objects (e.g., objects with same object identifiers) are serialized by different systems in a same manner. The object hasher 328 can use a salt value and an object attribute value for some or all attribute values, for instance. A salt value can prevent a brute force approach from being used to determine enumeration values, for example. Hashing and normalization is described in more detail below with respect to FIGS. 4 to 7.

The normalized and hashed objects 330 can be provided to a reporting component 332. The reporting component 332 can be configured to provide the normalized and hashed objects 330 to a data acceptance interface 334 of the monitor 322. The system 302 (and other systems) can report data to the monitor 322 on a regular basis, for example. Different approaches can be used for sending data from the reporting component 332 to the data acceptance interface 334. For example, the reporting component 332 can push data to the data acceptance interface 334, the data acceptance interface 334 can pull data from the reporting component 332, either component may invoke an API call of the other component, and/or an event infrastructure or mechanism may be used. In some cases, an administrator of either the system 302 or the monitor 322 can manually trigger a push or pull of normalized and hashed object data, respectively.

After receiving normalized and hashed objects from landscape systems, the monitor 322 can have different sets of normalized and hashed objects from different systems. For example, the monitor 322 can have a first set 336 of normalized and hashed object data from a first system (e.g., the system 302), a second set 338 of normalized and hashed object data from a second system (e.g., the system 312), and a third set 340 of normalized and hashed object data from some other system.

The different sets of normalized and hashed objects in the monitor 322 can be provided to a data evaluation component 342. The data evaluation component 342 can be an automated engine, as described above, or can include, for instance, a user interface that enables the data stocktaking expert 232, the retention framework administrator 234, and/or a data replication administrator 344 to enable the data stocktaking expert 232, the retention framework administrator 234, or the data replication administrator 344 (who may be the same or different users) to evaluate the normalized and hashed object data.

For example, the data evaluation component 342 can identify (or can be used to identify) objects for which normalized and hashed object data is different between systems. A difference in normalized and hashed object data can indicate a difference in attribute values of respective objects between systems. Such a difference may occur, for example, due to a misconfiguration of the MDI service 308, the other middleware 310, or the direct integration configuration 320. In response to detection of a difference between normalized and hashed object data between systems, the data replication administrator 344, for example, can reconfigure one or more of the MDI services 308, the other middleware 310, or the direct integration configuration 320.

Figure 4:
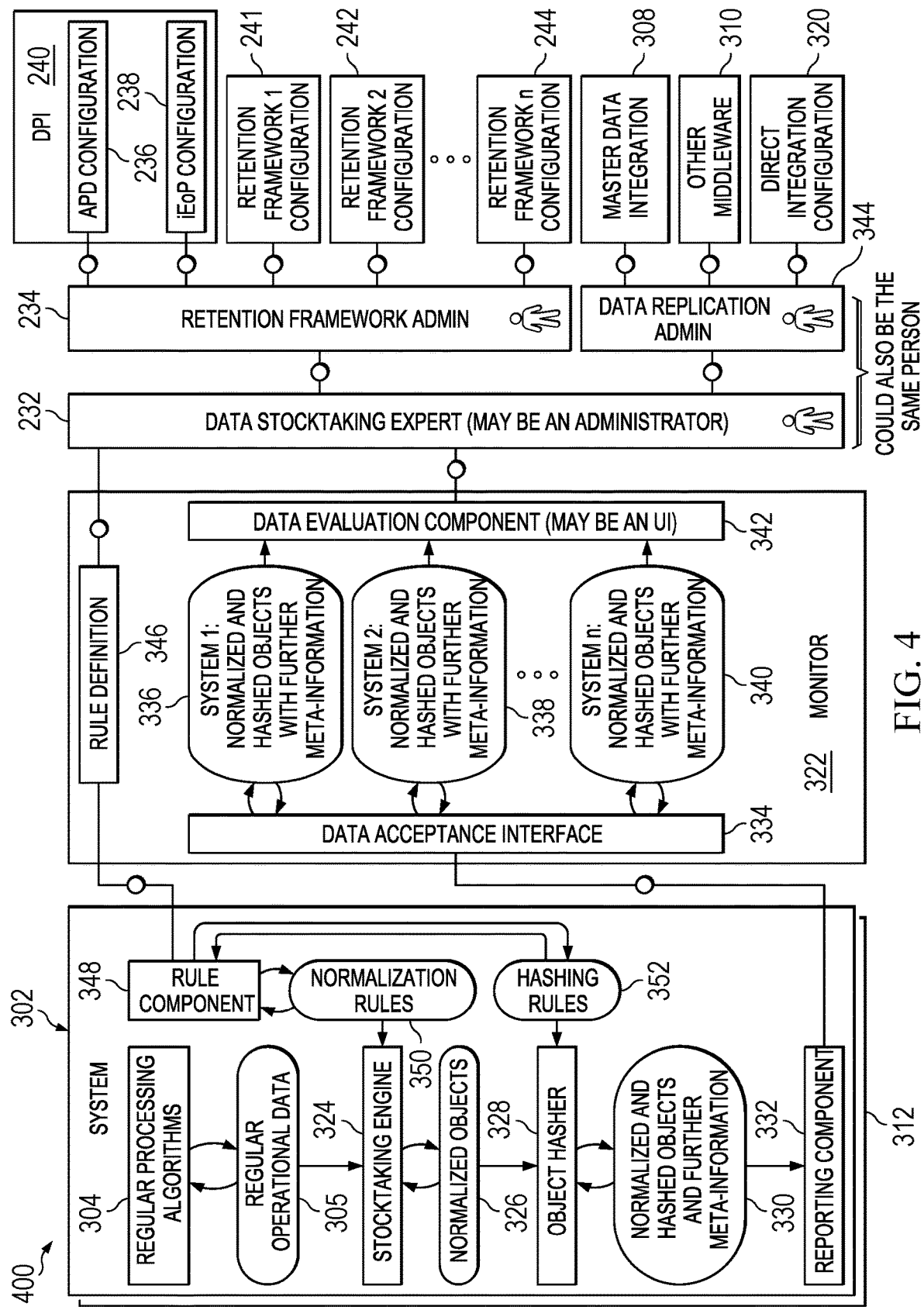
FIG. 4 illustrates an example system for determining inconsistencies in object attributes between systems using centrally-defined normalization and hashing rules.

FIG. 4 illustrates an example system 400 for determining inconsistencies in object attributes between systems using centrally-defined normalization and hashing rules. A rule definition component 346 of the monitor 322 can be used to define central normalization rules and hashing rules. A communication mechanism (e.g., API, events, push approach, pull approach) can be used to distribute normalization rules and hashing rules to a rule component 348 in each system. The stocktaking engine 324 can access normalization rules 350 from the rule component 348 and use the normalization rules 350 when generating the normalized objects 326. The object hasher 328 can access hashing rules 352 from the rule component 348 and use the hashing rules 352 when generating the normalized and hashed objects 330.

The normalization rules 350 can specify whether and how certain attributes should be normalized before attribute values of those attributes are hashed by the object hasher 328. For instance, the normalization rules may specify that some or all text attributes be converted to either upper or lower case before being hashed. In some cases names but not email addresses are to be converted to a particular case. Email addresses in different cases may be considered as entirely different email addresses in some landscapes. However, in other landscapes or systems, an administrator may create a rule that specifies that all text values, including email addresses, be converted to a particular case, if the landscape uses email servers that do not distinguish email addresses by case, for example.

The hashing rules 352 can specify certain ways hashing is to be performed. For example, the hashing rules 352 can specify how object attributes are to be serialized before being hashed. For instance, the hashing rules 352 can be or include a domain model alignment definition of object types (e.g., classes) that may be used to define which attribute values of which attributes of object instances are included in a serialized version of the object instance, and in which order. As another example, the hashing rules can specify whether to use a salt value when hashing (and in some cases, which salt values or rules for how to generate a salt value). Other approaches can be used for systems using same normalization and hashing approaches, as described below.

Figure 5:
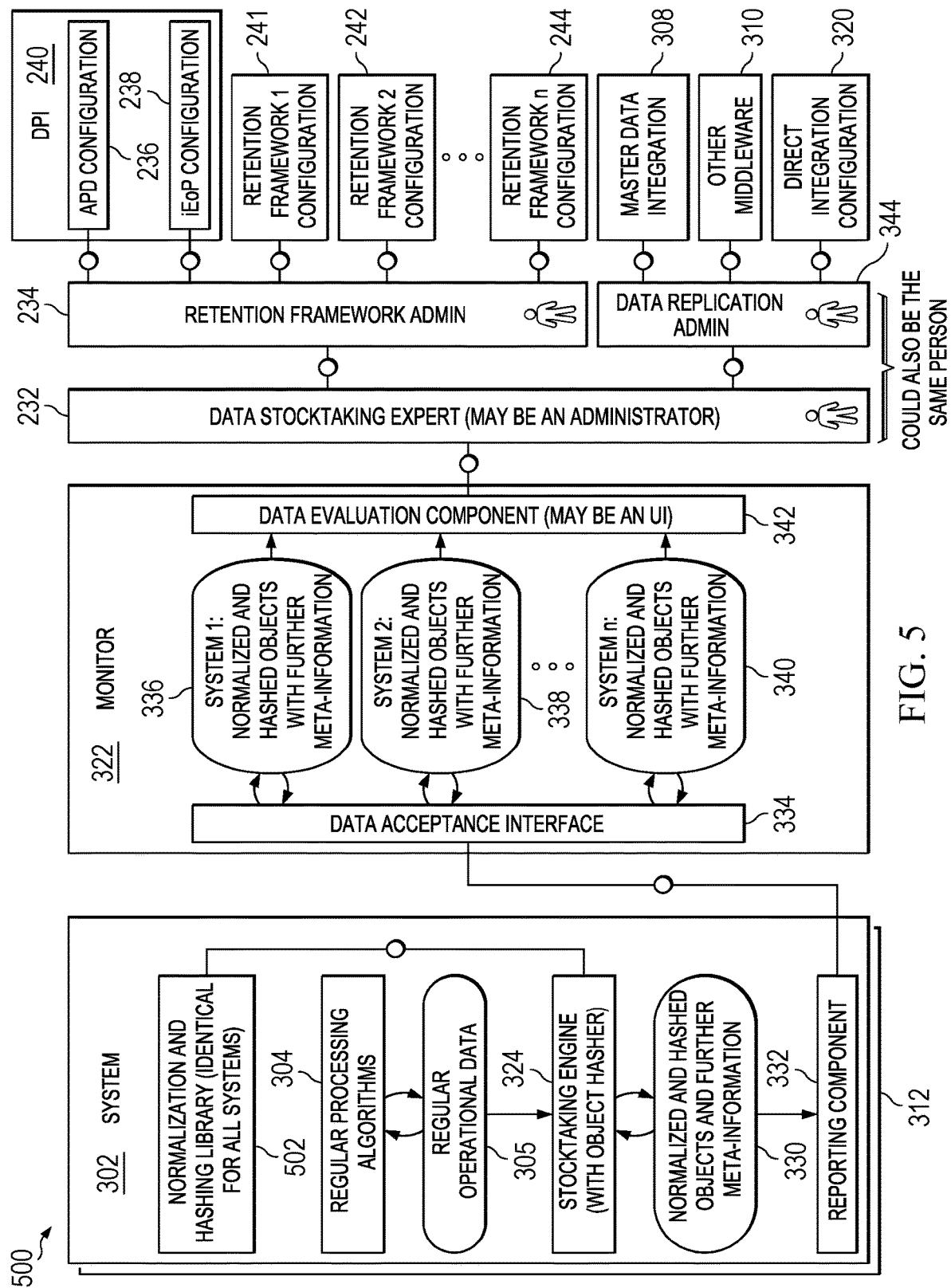
FIG. 5 illustrates an example system for determining inconsistencies in object attributes between systems using a normalization and hashing library.

FIG. 5 illustrates an example system 500 for determining inconsistencies in object attributes between systems using a normalization and hashing library. The example system 500 includes a same normalization and hashing library 502 in each landscape system. Having each system use a same library can ensure that normalization and hashing of object attributes is performed in a same manner in all systems. The normalization and hashing library 502 can include normalization and hashing rules and/or functions that have been implemented to use common normalization and/or hashing rules. If an update needs to be made to the normalization and hashing library 502, an updated library can be provided to each system.

Figure 6:
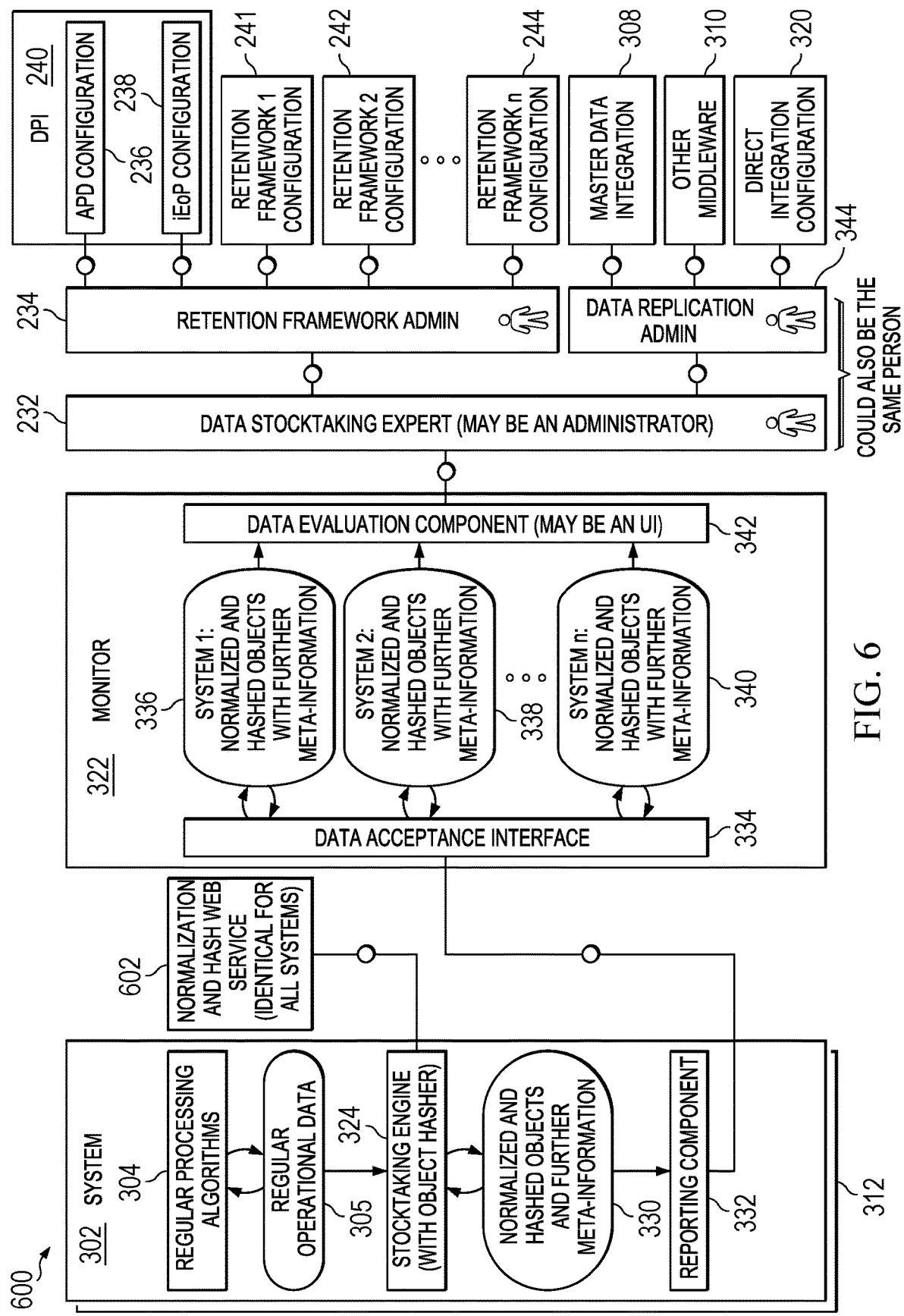
FIG. 6 illustrates an example system for determining inconsistencies in object attributes between systems using a normalization and hashing web service.

FIG. 6 illustrates an example system 600 for determining inconsistencies in object attributes between systems using a normalization and hashing web service 602. The normalization and hashing web service 602 can include normalization and hashing services that have been implemented to use common normalization and/or hashing rules. The stocktaking engine 324 in each system can invoke the normalization and hashing web service 602 for normalization functionality and an object hasher in or associated with the stocktaking engine 324 can invoke the normalization and hashing web service 602 for hashing functionality. Having each system use a same web service can ensure that normalization and hashing of object attributes is performed in a same manner in all systems.

Figure 7:
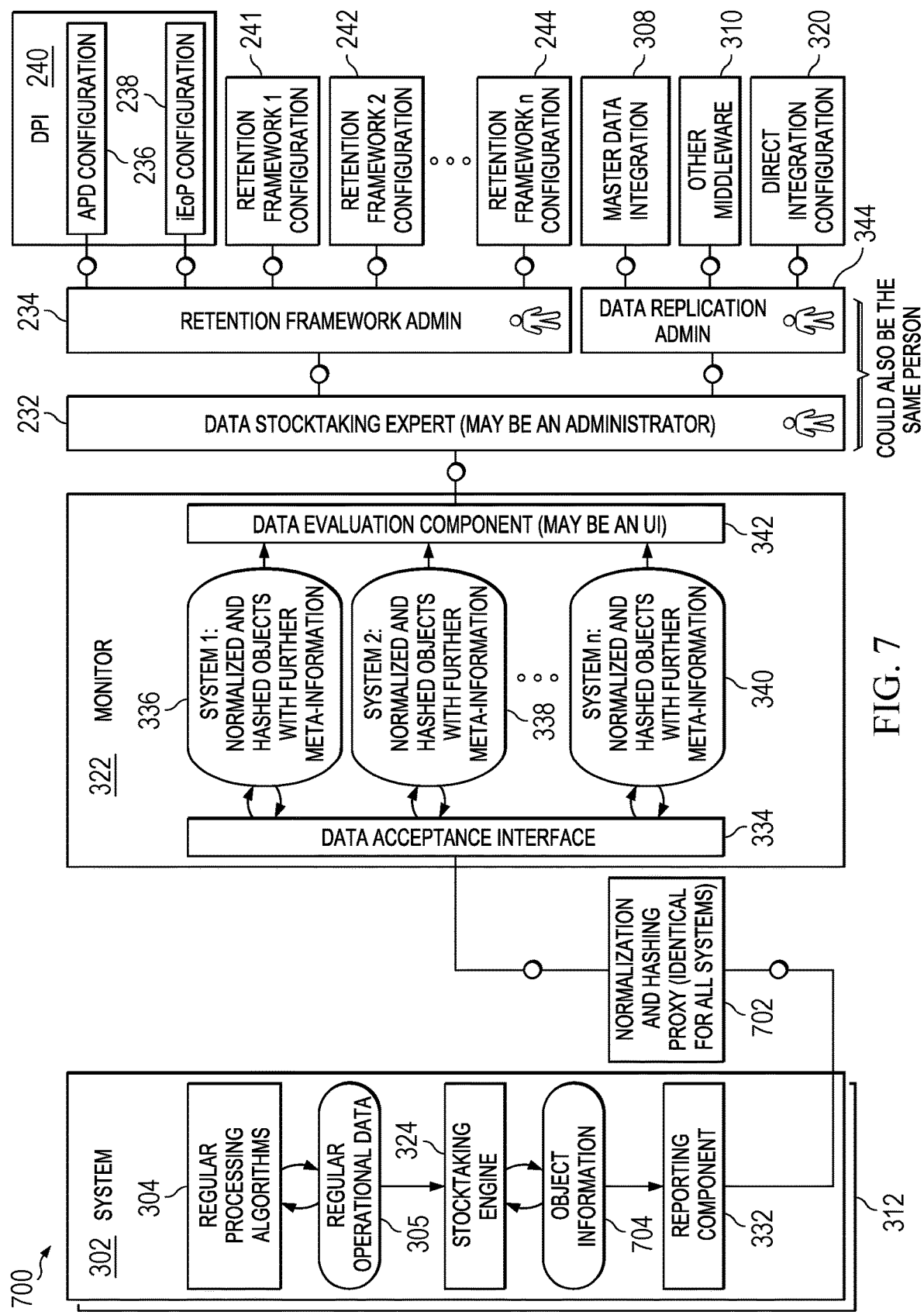
FIG. 7 illustrates an example system for determining inconsistencies in object attributes between systems using a proxy service.

FIG. 7 illustrates an example system 700 for determining inconsistencies in object attributes between systems using a proxy service 702. The proxy service 702 can be positioned communicatively between a sending system such as the system 302 and the monitor 322. The proxy service 702 can include normalization and hashing functionality that has been implemented to use common normalization and hashing rules. The stocktaking engine 324 in each system can provide object information 704 to the reporting component 332 and the reporting component 332 can invoke the proxy service 702 to request normalization and hashing of the object information 704. The proxy service 702 (rather than a respective system) can provide normalized and hashed object data to the monitor 322. Having each system use a same proxy service can ensure that normalization and hashing of object attributes is performed in a same manner in all systems.

Figure 8:
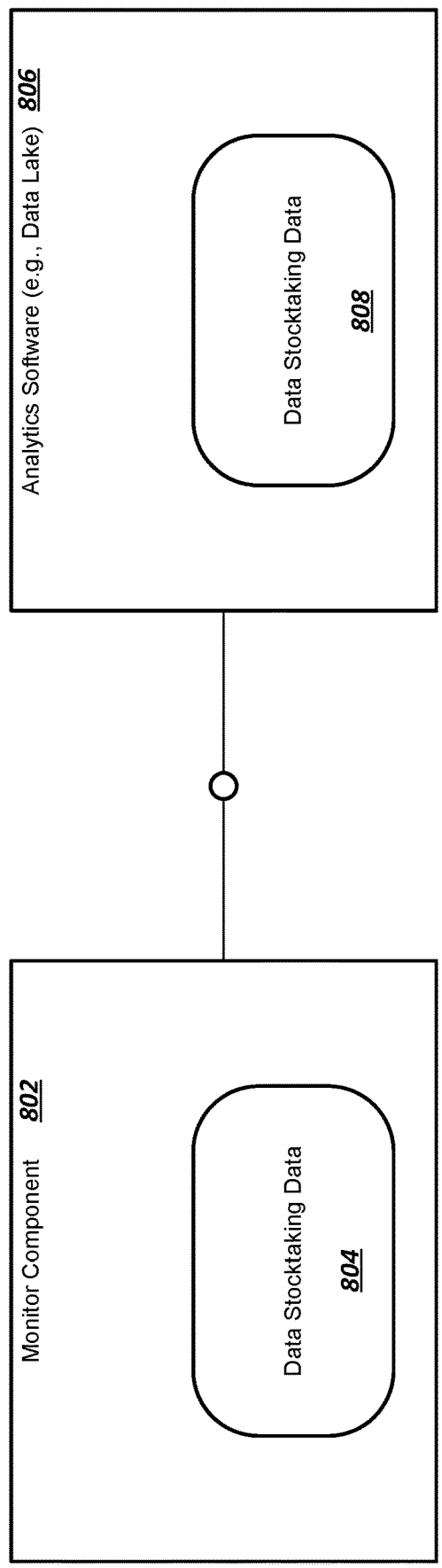
FIG. 8 illustrates an example system for replication of data stocktaking data.

FIG. 8 illustrates an example system 800 for replication of data stocktaking data. As mentioned above, a data stocktaking solution, such as described for FIG. 2, may be used to collect information about data objects processed (or not processed) by different applications or systems. For example, a monitor component 802 (which may be, for example, the central monitor 216) of a data stocktaking service may store data stocktaking data 804 submitted by different applications and enable software administrators to identify misconfigurations. The data stocktaking data 804 may be submitted with different technical means to the monitor component 802 and may include different levels of details of concerned data objects, depending on different use cases.

For example, the data stocktaking data 804 may include meta information about data that is processed in different software applications or systems in a landscape. The data stocktaking data 804 may include details, for example, about which object is present in which application or system, whether an object is considered under processing by that application or system, and/or meta information such as a last updated timestamp. In some implementations, such as described above with respect to FIGS. 3 to 7, the data stocktaking data 804 might include a hash value of the normalized and serialized object in each application, which can be used, for example, to identify whether relevant attributes are different in different applications or systems.

The data stocktaking data 804 can, in data stocktaking solutions, be monitored by an administrator in a monitoring component (e.g., as described above with respect to FIG. 2). The administrator may use the data stocktaking data 804 to make changes to the configuration of data privacy integration protocols such as integrated end-of-purpose or aligned purpose association, or to data replication configurations, such as mechanisms in a master data integration service, or in other middle-wares. However, in addition to or alternatively to administrator-monitored approaches, automatic approaches can be used for evaluating and taking action based on data stocktaking data.

For instance, certain rules can be implemented for automatic alerts (and/or automatic reconfiguration). Automation can allow administrators to act or be notified faster about situations, with less manual effort (as compared to administrator monitoring approaches). In some cases, automatic approaches are performed in the monitor component 802. In other implementations, automatic approaches are performed in an analytics software engine 806 (e.g., a data lake).

For example, the data stocktaking data 804 can periodically be sent from the monitor component 802 to the analytics software engine 806, for storage as data stocktaking data 808. For example, data can be pushed from the monitor component 802 to the analytics software engine 806, pulled from the monitor component to the analytics software engine 806 by the analytics software engine 806, etc. Various data anonymization approaches can be used, as described in more detail below with respect to FIGS. 11 and 12.

Figure 9:
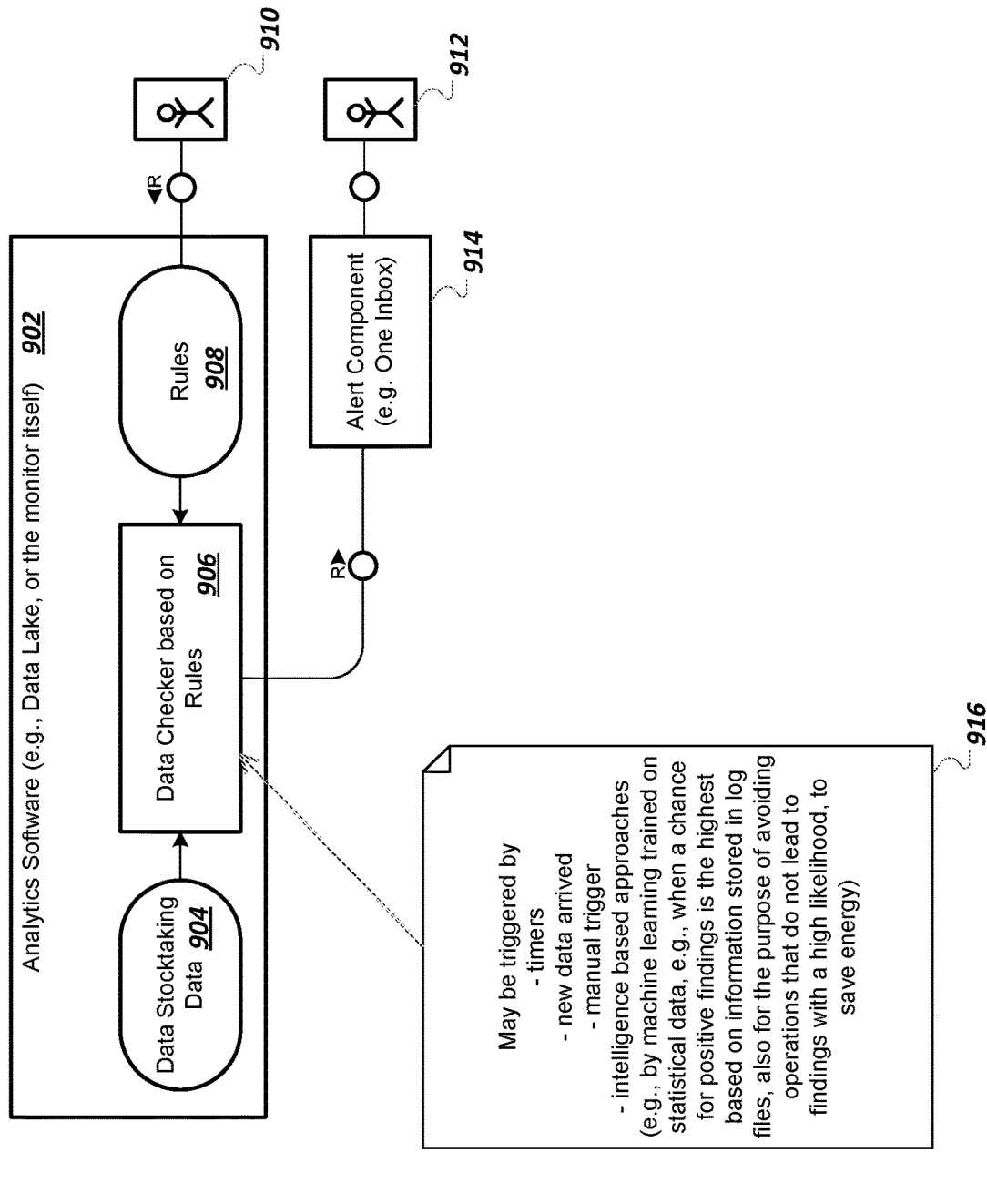
FIG. 9 illustrates an example system for automatically analyzing data stocktaking data based on configured rules.

FIG. 9 illustrates an example system 900 for automatically analyzing data stocktaking data based on configured rules. As described above, an analytics software engine 902

(which may be the analytics software engine 806 or a component of the monitor component 802) has and/or has access to data stocktaking data 904. A data checker 906 of the analytics software engine 902 may automatically analyze the data stocktaking data 904 based on predefined rules 908. The predefined rules 908 may be defined by an administrator 910 (or, in some implementations, an automated component can define and/or modify the predefined rules 908).

Different types of predefined rules 908 can be used by the data checker 906. For example, a first rule may specify that a data object of type "Sales Order" that is present in a first application should also be present in a second application no more than twenty five (25) hours after appearing in the first application. The first rule can include an action that specifies that if the rule is violated (e.g., the object is not present in the second application) that a notification be automatically sent to an administrator 912 (who may be the same as or different from the administrator 910). As another example, a second rule can specify that a data object of type "Sales Order" that has been present in both a first application and a second application should be deleted in both applications at substantially a same point in time, and that a notification be automatically sent if the object was deleted in one of the applications but is still present in the other application after twenty five (25) hours since detection of the object deletion in one of the applications.

A third example rule can be that a first object instance, in a first system, of a type "Business Partner", with a certain object identifier, should have the same object attributes as a second object instance, in a second system, that has the same object type and identifier, and that a notification should automatically be triggered if the attributes are not the same between the two instances, after twelve (12) hours of detecting a change in object attributes of either instance. A fourth example rule can be that a notification can be automatically triggered if a first system that is configured to receive data replicated from a second system (or from a replication intermediary) has more than a threshold different number of Purchase Requisition objects than the second system. A fifth example rule can be to automatically send a notification if an overall trend is detected in the data stocktaking data 904. For instance, the data checker 906 can employ one or more data analytics or artificial intelligence algorithms to determine that for a certain system a list of objects not under processing has generally increased over time.

Different approaches can be used to notify the administrator 912 if any of the predefined rules 908 are triggered, matched, or violated. For instance, an alert component 914 can be used to automatically alert the administrator 912. The alert component 914 can be or include a "one inbox" mechanism in that alerts triggered by the data checker 906 are received by the administrator 912 in a same inbox as used for other system notifications. Alerts can be added to a working list of the administrator 912, for example. In some cases, the administrator 912 can use the alert component 914 to forward an alert to another individual (for viewing by that individual in that individual's inbox, such as in a working list of the individual).

As indicated in a note 916, rule evaluation by the data checker 906 can be triggered in different ways. For instance, rule evaluation may be triggered when a timer elapses (e.g., for periodic evaluation), the data stocktaking data 904 includes new data, a manual trigger (e.g., by the administrator 910 or the administrator 912) occurs, or when an artificial-intelligence based approach triggers evaluation. For instance, the analytics software engine 902 can determine when to evaluate rules (and also, in some cases, when to send notifications). For instance, machine learning approaches can determine rule evaluation time points, processing intervals, etc., that may lead to a highest likelihood of finding issues with the data stocktaking data 904. Time points or timeframes for when to trigger alerts or notifications may relate to a known or expected schedule for the administrator 912, and/or can be based on priority of an issue caused by matching or violation of a rule (e.g., higher priority issues may trigger immediate notification, possibly using different notification channels, and lower priority issues may trigger a delayed notification to match a likely availability of the administrator 912 to view the alert).

Figure 10:
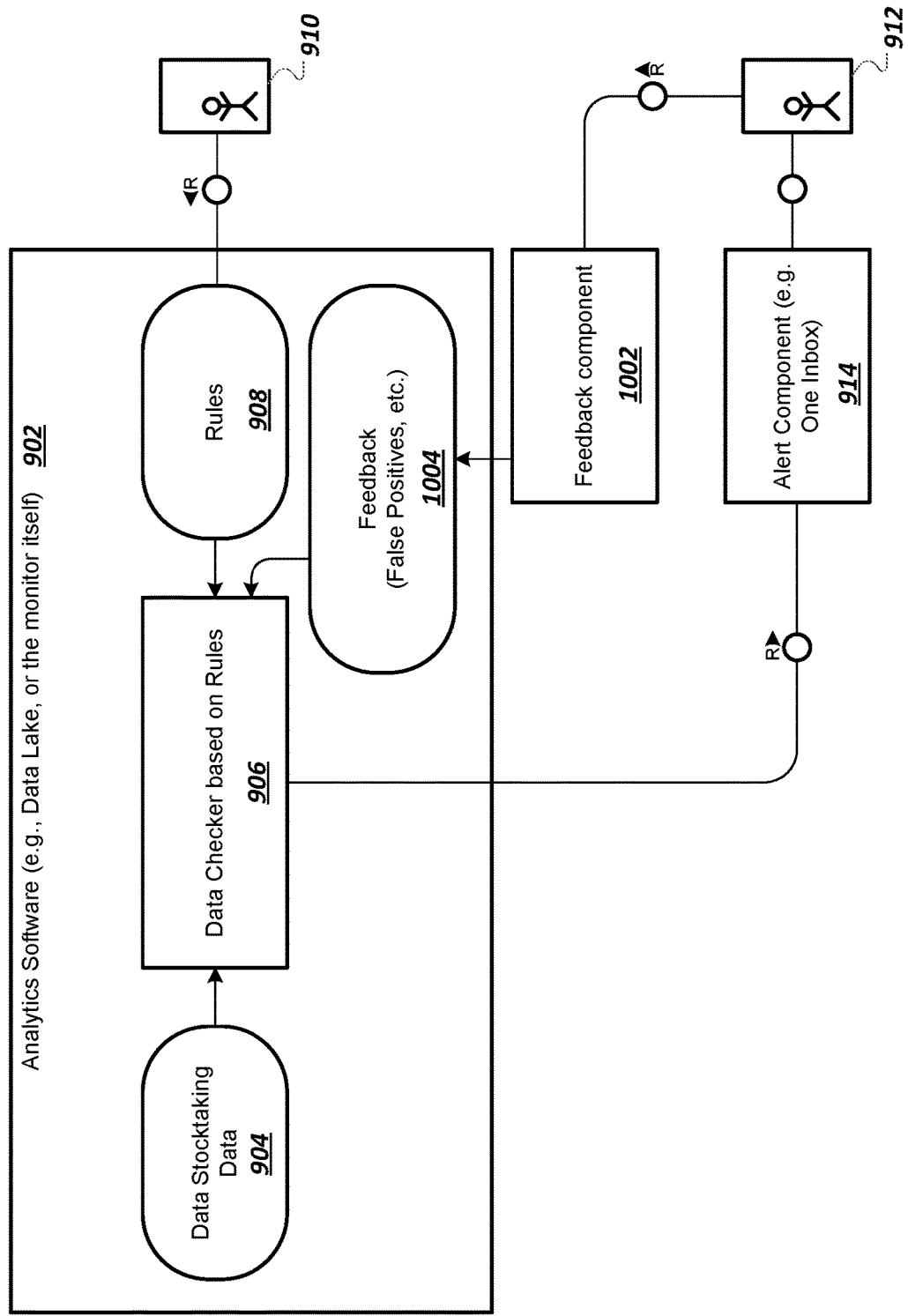
FIG. 10 illustrates an example system for modifying automatic evaluation of data stocktaking data based on received feedback.

FIG. 10 illustrates an example system 1000 for modifying automatic evaluation of data stocktaking data based on received feedback. The system 1000 is similar to the system 900, with an analytics software engine 902, data stocktaking data 904, data checker 906, predefined rules 908, administrators 910 and 912, and alert component 914. In the system 1000, the administrator 912 can use a feedback component 1002 to provide feedback 1004 to the data checker 906. The feedback 1004 can include, for instance, indications of false positives relating to previously-received alerts. False positive indications can be, for example for one of the following combinations: object and system; object, system, and purpose; purpose and system, purpose and object; or purpose, object, and system. The feedback 1004 can indicate that a received alert was actually for a test object. As another example, the feedback 1004 can indicate that an alert is one that can otherwise be ignored (e.g., no action necessary). The data checker 906 can adjust rule evaluation based on the feedback 1004. For example, alerts can be muted for a certain time period for a rule type for which feedback was given for a prior alert provided to the administrator 912. The time period for which to mute an alert can be a default time period (e.g. one month), can be determined based on a severity level of the alert (e.g., with more severe alerts being muted for a shorter time period than less severe alerts), can be specified by the administrator 912 in the feedback 1004, or can be otherwise configured by the data checker 906. For instance, the data checker 906 may choose a longer time period than used for previous alerts of a same type, if the administrator 912 provides additional (e.g., multiple sets of) feedback for a same alert type indicating that alerts of that type can currently be ignored.

Figure 11:
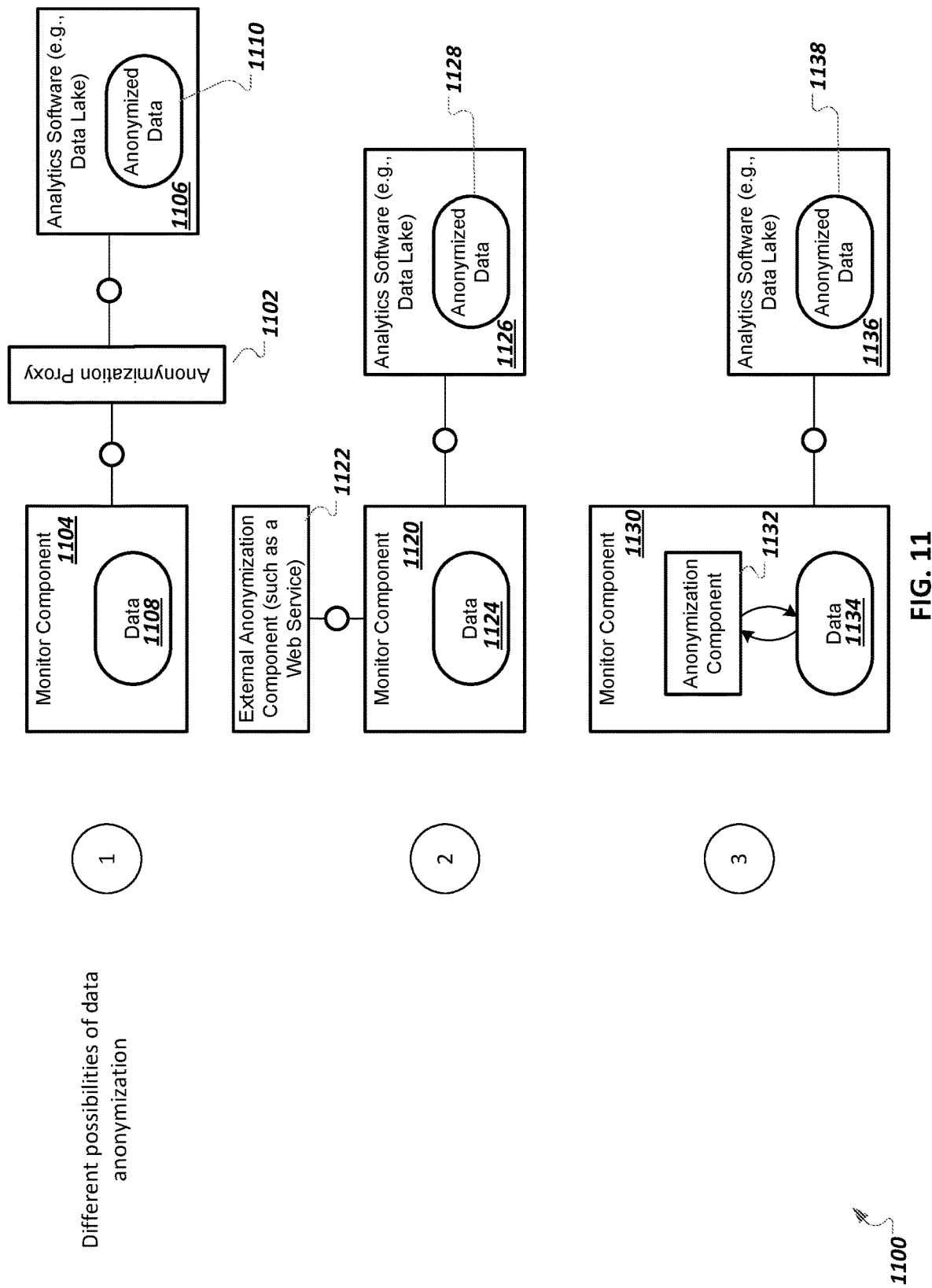
FIG. 11 is a diagram that illustrates different data anonymization approaches.

FIG. 11 is a diagram 1100 that illustrates different data anonymization approaches. Data can be anonymized before being automatically evaluated based on rules, for example. For instance, for many types of misconfigurations, it may be sufficient to alert an administrator about a potential issue and perhaps an involved object type, without informing the administrator about details of actual affected object instances. In a first example, an anonymization proxy 1102 can sit between a monitor component 1104 and an analytics software engine 1106. The anonymization proxy 1102 can anonymize data stocktaking data 1108 and provide the anonymized data to the analytics software engine 1106, for storage in and use by the analytics software engine 1106 as anonymized data 1110. Anonymization can be performed by hashing object identifiers, for example.

In a second example, a monitor component 1120 can use an external component, such as a web service 1122, to anonymize data stocktaking data 1124. The web service 1122 or the monitor component 1120 can provide anonymized data to an analytics software engine 1126, for storage in and use by the analytics software engine 1126 as anonymized data 1128. In a third example, a monitor component 1130 includes an internal anonymization component 1132, that can anonymize data stocktaking data 1134. The monitor component 1130 can provide anonymized data to an analytics software engine 1136, for storage in and use by the analytics software engine 1136 as anonymized data 1138.

Figure 12:
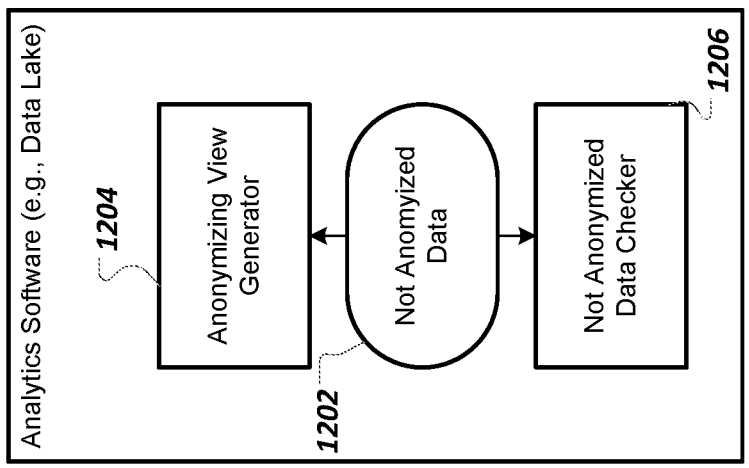
FIG. 12 illustrates an example analytics software engine for providing an anonymized view of data stocktaking data.

FIG. 12 illustrates an example analytics software engine 1200 for providing an anonymized view of data stocktaking data. While FIG. 11 discusses different approaches for anonymization, for some use cases, anonymization might not enable desired analysis. Accordingly, the analytics software engine 1220 can include not-anonymized data 1202 (e.g., as received from a monitor component through replication). An anonymizing view generator 1204 can generate an anonymized view for purposes of analyzing data stocktaking data for portions or use cases for which an anonymized evaluation is sufficient. Accordingly, authorized users/administrators can view anonymized data when possible. However, for cases in which a misconfiguration cannot be properly identified or understood without inspection of affected objects, a not-anonymized data checker 1206 can be used to provide access to the not-anonymized data 1202 by authorized users. For instance, two administrators could use a four-eyes principle approach to agree on a misconfiguration indicated in the not-anonymized data 1202.

Figure 13:
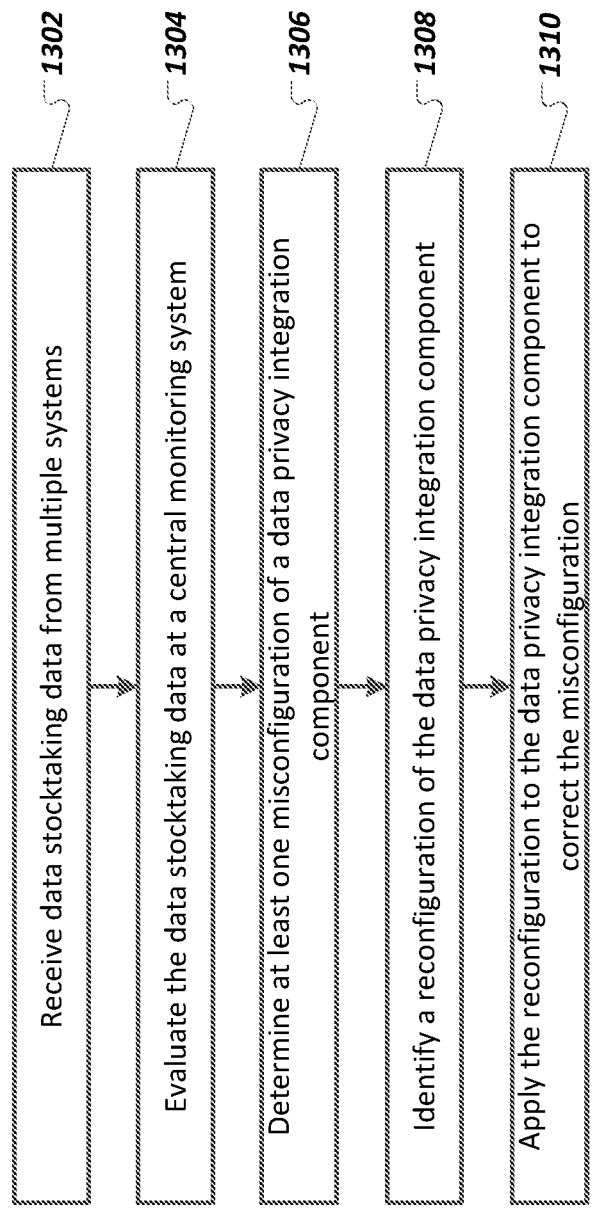
FIG. 13 is a flowchart of an example method for evaluation of data stocktaking information.

FIG. 13 is a flowchart of an example method 1300 for evaluation of data stocktaking information. It will be understood that method 1300 and related methods may be performed, for example, by any suitable system, environment, software, and hardware, or a combination of systems, environments, software, and hardware, as appropriate. For example, one or more of a client, a server, or other computing device can be used to execute method 1300 and related methods and obtain any data from the memory of a client, the server, or the other computing device. In some implementations, the method 1300 and related methods are executed by one or more components of the system 100 described above with respect to FIG. 1. For example, the method 1300 and related methods can be executed by the server 102 of FIG. 1.

At 1302, data stocktaking data regarding objects in respective systems, is received from multiple systems in a multi-system landscape. The data stocktaking data includes, for each respective system, a list of objects under processing in the respective system and a list of objects not under processing in the respective system. The data stocktaking data can be sent by a respective system in response to an event, such as a next periodic interval or a threshold number of objects having been changed in the respective system since a last sending of data stocktaking data by the respective system. The data stocktaking data can include one or more of a last changed date, a predicted end-of-purpose date, or purposes assigned to objects. The data stocktaking data for a respective system can include data for all objects stored in the respective system or for objects that have had a change in status since a last sending of data stocktaking data by the respective system. In some implementations, the data stocktaking data for a respective system can include a list of paused objects that appear to not be under processing in the respective system but are still under processing in the respective system. In other implementations, the respective system resolves a paused object to either an object under processing or an object not under processing before data stocktaking data for the object is sent.

At 1304, the data stocktaking data is evaluated at a central monitoring system.

At 1306, at least one misconfiguration of a data privacy integration component that manages data privacy integration in the multi-system landscape is determined based on the evaluation of the data stocktaking data. As an example, identifying the misconfiguration can include determining that a first object has been deleted in a first system but not in a second system. As another example, identifying the misconfiguration can include determining that a first system has a purpose mapped to a first object but that the first system has not processed the first object for the first purpose in more than a threshold amount of time.

In some implementations, determining a misconfiguration can include automatically determining that the data stocktaking data matches at least one predefined rule. A first rule can specify that the misconfiguration occurs when a first system includes a first object having a first object identifier and a second system does not include any object with the first object identifier after a threshold amount of time after detecting the first object in the first system. A second rule can specify that the misconfiguration occurs when a first object with a first object identifier remains in a first system for more than a threshold amount of time after a second object with the first object identifier has been deleted from a second system. A third rule can specify that the misconfiguration occurs when a first object instance with a first object identifier in a first system has different attributes after a threshold amount of time has passed since modification of attributes of a second object instance in a second system that has the first object identifier. A fourth rule can specify that the misconfiguration occurs when a first system that is configured to receive data from a second system has more than a threshold different number of objects of a first object type than the second system. A fifth rule can specify that the misconfiguration occurs when a determination is made that a number of objects not under processing in a first system has increased more than a threshold amount during a time period.

At 1308, for each identified misconfiguration, a reconfiguration of the data privacy integration component is identified. For example, identifying the misconfiguration can include determining that a number of objects in the list of objects not under processing by a first system exceeds a threshold and determining, as the misconfiguration, that the first system is not configured as a responder for at least one object type in an integrated end-of-purpose protocol. In this example, the reconfiguration can include reconfiguring the integrated end-of-purpose protocol so that the first system is a responder for the at least one object type for the integrated end-of-purpose protocol.

As yet another example, identifying the misconfiguration can include determining that a first purpose has been disassociated from a first object in a first system but not in a second system based on a misconfiguration in an aligned purpose disassociation protocol. In this example, the reconfiguration can include reconfiguring the aligned purpose disassociation protocol to correct the misconfiguration.

At 1310, the reconfiguration of the data privacy integration component to is applied correct the misconfiguration, for each respective misconfiguration.

Figure 14:
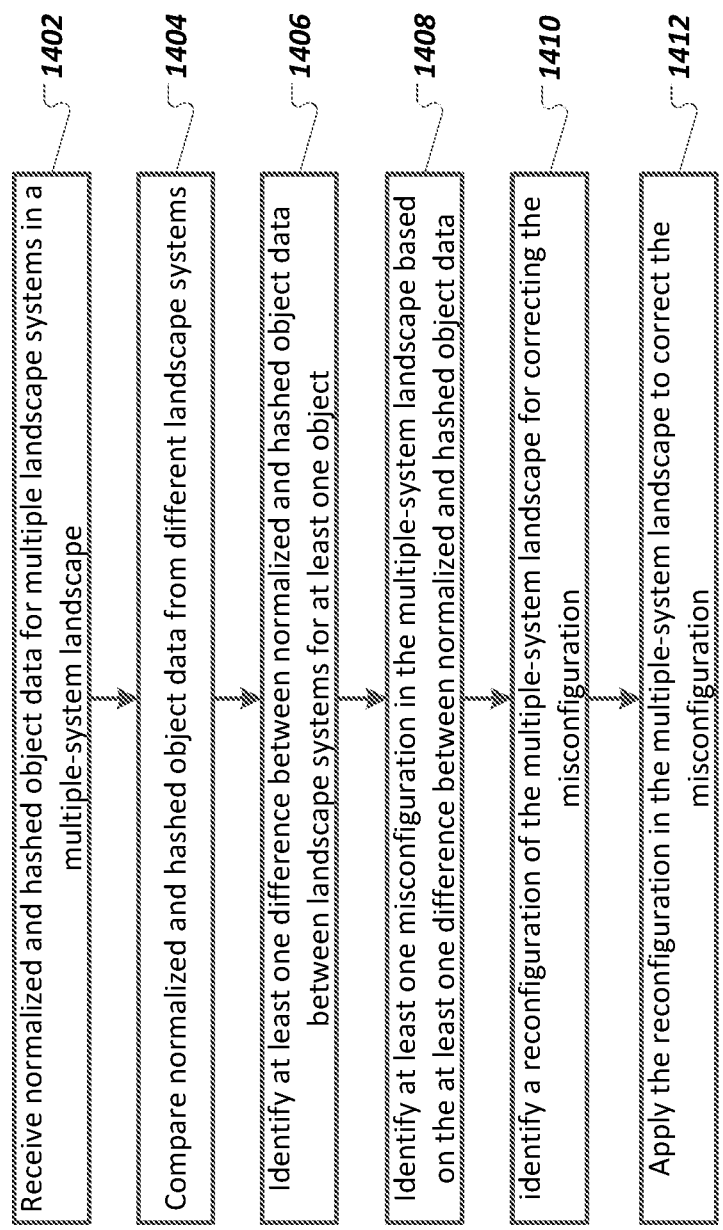
FIG. 14 is a flowchart of an example method for determining inconsistencies in object attributes between systems.

FIG. 14 is a flowchart of an example method 1400 for determining inconsistencies in object attributes between systems. It will be understood that method 1400 and related methods may be performed, for example, by any suitable system, environment, software, and hardware, or a combination of systems, environments, software, and hardware, as appropriate. For example, one or more of a client, a server, or other computing device can be used to execute method 1400 and related methods and obtain any data from the memory of a client, the server, or the other computing device. In some implementations, the method 1400 and related methods are executed by one or more components of the system 100 described above with respect to FIG. 1. For example, the method 1400 and related methods can be executed by the server 102 of FIG. 1.

At 1402, normalized and hashed object data for multiple landscape systems in a multi-system landscape is received. The normalized and hashed object data can include normalized and hashed object attributes. For example, received normalized and hashed object data can include hashed versions of object attributes that have been normalized according to normalization rules. In some case, the normalization rules are provided to each landscape system and the normalized and hashed object data includes hashed versions of normalized object data that has been normalized by respective landscape systems according to the normalization rules. The normalization rules can include rules for transforming certain object attributes of certain types into normalized object attributes. The normalized and hashed object data can include hashed versions of normalized object data that has been normalized by a proxy service. The proxy service can perform both the normalization and generation the hashed versions and the normalized and hashed object data can be received from the proxy service. In other implementations, normalized and serialized object attributes may have been hashed by respective landscape systems and the normalized and hashed object data can be received from the respective landscape systems. Received normalized and hashed object data can include hashed versions of serialized object attributes that have been hashed according to hashing rules. The hashing rules can be provided to each landscape system and the hashed versions of normalized object data can include data that has been hashed by respective landscape systems according to the hashing rules. The hashing rules can specify which object attributes to serialize before normalized and serialized object data is hashed and in what order object attributes are to be serialized before normalized and serialized object data is hashed. Normalized and hashed object data can include object use information for each object indicating whether objects are currently in use by a landscape system. In some cases, normalizing and hashing of object data can be performed by a normalization and hashing library provided to each landscape system or by a web service invoked by each landscape system.

At 1404 normalized and hashed object data from different landscape systems is compared.

At 1406, at least one difference between normalized and hashed object data between landscape systems is identified for at least one object.

At 1408, at least one misconfiguration in the multi-system landscape is identified based on the at least one difference between normalized and hashed object data between landscape systems. In some cases, identifying the misconfiguration can include identifying the misconfiguration based at least in part on the object use information. The misconfiguration can be identified by an automated misconfiguration identification component or by an administrator of the multi-system landscape. Identifying a first misconfiguration can include identifying a misconfiguration of a first integration point used to replicate object data and associated purpose information between systems. The first integration point can be a master data integration service, replication middleware, or a direct system to system integration configuration.

At 1410, a reconfiguration of the multi-system landscape is identified for correcting the misconfiguration. Identifying a reconfiguration can include identifying a change to the first integration point, such as a change to the master data integration service, replication middleware, or the direct system to system integration configuration At 1412, the reconfiguration is applied in the multi-system landscape to correct the misconfiguration.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

In view of the above described implementations of subject matter this application discloses the following list of examples, wherein one feature of an example in isolation or more than one feature of said example taken in combination and, optionally, in combination with one or more features of one or more further examples are further examples also falling within the disclosure of this application.

EXAMPLES

Example 1. A computer-implemented method comprising:
receiving, from multiple systems in a multi-system landscape, data stocktaking data regarding objects in respective systems, wherein the data stocktaking data comprises, for each respective system, a list of objects under processing in the respective system and a list of objects not under processing in the respective system;
evaluating the data stocktaking data at a central monitoring system;
determining, based on the evaluating, at least one misconfiguration of a data privacy integration component that manages data privacy integration in the multi-system landscape;
for each identified misconfiguration, identifying a reconfiguration of the data privacy integration component; and
applying the reconfiguration of the data privacy integration component to correct the misconfiguration.

Example 2. The computer-implemented method of Example 1, wherein the data stocktaking data is sent by a respective system in response to an event, wherein the event comprises a next periodic interval or a threshold number of objects having been changed in the respective system since a last sending of data stocktaking data by the respective system.

Example 3. The computer-implemented method of any one of the preceding examples, wherein data stocktaking data includes one or more of a last changed date, a predicted end-of-purpose date, or purposes assigned to objects.

Example 4. The computer-implemented method of any one of the preceding examples, wherein data stocktaking data for a respective system includes all objects stored in the respective system or objects that have had a change in status since a last sending of data stocktaking data by the respective system.

Example 5. The computer-implemented method of any one of the preceding examples, wherein data stocktaking data for a respective system includes a list of paused objects that appear to not be under processing in the respective system but are still under processing in the respective system.

Example 6. The computer-implemented method of any one of the preceding examples, wherein:
  identifying the misconfiguration comprises:
    determining that a number of objects in the list of objects not under processing by a first system exceeds a threshold; and
    determining, as the misconfiguration, that the first system is not configured as a responder for at least one object type in an integrated end-of-purpose protocol; and
  the reconfiguration comprises reconfiguring the integrated end-of-purpose protocol so that the first system is a responder for the at least one object type for the integrated end-of-purpose protocol.

Example 7. The computer-implemented method of any one of the preceding examples, wherein identifying the misconfigurations comprises determining that a first object has been deleted in a first system but not in a second system.

Example 8. The computer-implemented method of any one of the preceding examples, wherein:
  identifying the misconfiguration comprises determining that a first purpose has been disassociated from a first object in a first system but not in a second system based on a misconfiguration in an aligned purpose disassociation protocol; and
  the reconfiguration comprises reconfiguring the aligned purpose disassociation protocol to correct the misconfiguration.

Example 9. The computer-implemented method of any one of the preceding examples, wherein identifying the misconfiguration comprises determining that a first system has a purpose mapped to a first object but that the first system has not processed the first object for the first purpose in more than a threshold amount of time.

Example 10. The computer-implemented method of any one of the preceding examples, wherein determining a misconfiguration comprises automatically determining that the data stocktaking data matches at least one predefined rule.

Example 11. The computer-implemented method of any one of the preceding examples, wherein a first rule specifies that the misconfiguration occurs when a first system includes a first object having a first object identifier and a second system does not include any object with the first object identifier after a threshold amount of time after detecting the first object in the first system.

Example 12. The computer-implemented method of any one of the preceding examples, wherein a second rule specifies that the misconfiguration occurs when a first object with a first object identifier remains in a first system for more than a threshold amount of time after a second object with the first object identifier has been deleted from a second system.

Example 13. The computer-implemented method of any one of the preceding examples, wherein a third rule specifies that the misconfiguration occurs when a first system that is configured to receive data from a second system has more than a threshold different number of objects of a first object type than the second system.

Example 14. The computer-implemented method of any one of the preceding examples, wherein a fourth rule specifies that the misconfiguration occurs when a determination is made that a number of objects not under processing in a first system has increased more than a threshold amount during a time period.

Example 15. The computer-implemented method of any one of the preceding examples, wherein:
  a fifth rule specifies that the misconfiguration occurs when a determination is made, after a threshold amount of time has passed since modification of first object attributes of a first object instance with a first object identifier in a first system, that second object attributes of a second object instance with the first object identifier in a second system are different than the first object attributes;
  the misconfiguration is identified as a misconfiguration of an integration point used to replicate object data and associated purpose information between systems; and
  the reconfiguration is a reconfiguration of the integration point.

Example 16. The computer-implemented method of any one of the preceding examples, wherein determining that the second object attributes are different than the first object attributes comprises comparing a normalized and hashed version of the first object attributes to a normalized and hashed version of the second object attributes.

Example 17. The computer-implemented method of any one of the preceding examples, wherein the normalized and hashed version of the first object attributes is generated by one of the first system, a common library provided to the first system and the second system, a proxy service invoked by the first system, or a web service invoked by the first system.

Example 18. The computer-implemented method of any one of the preceding examples, wherein:
  a normalized version of object attributes is generated based on common normalization rules that specify which and how certain attribute values of an object are to be normalized before hashing of object attribute data occurs; and
  a normalized and hashed version of object attributes is generated based on applying common hashing rules to normalized object data.

Example 19. A system comprising:
one or more computers; and
a computer-readable medium coupled to the one or more computers having instructions stored thereon which, when executed by the one or more computers, cause the one or more computers to perform operations comprising:
  receiving, from multiple systems in a multi-system landscape, data stocktaking data regarding objects in respective systems, wherein the data stocktaking data comprises, for each respective system, a list of objects under processing in the respective system and a list of objects not under processing in the respective system;
  evaluating the data stocktaking data at a central monitoring system;
  determining, based on the evaluating, at least one misconfiguration of a data privacy integration component that manages data privacy integration in the multi-system landscape;

for each identified misconfiguration, identifying a reconfiguration of the data privacy integration component; and applying the reconfiguration of the data privacy integration component to correct the misconfiguration.

Example 20. A computer program product encoded on a non-transitory storage medium, the product comprising non-transitory, computer readable instructions for causing one or more processors to perform operations comprising:

receiving, from multiple systems in a multi-system landscape, data stocktaking data regarding objects in respective systems, wherein the data stocktaking data comprises, for each respective system, a list of objects under processing in the respective system and a list of objects not under processing in the respective system;

evaluating the data stocktaking data at a central monitoring system;

determining, based on the evaluating, at least one misconfiguration of a data privacy integration component that manages data privacy integration in the multi-system landscape;

for each identified misconfiguration, identifying a reconfiguration of the data privacy integration component; and applying the reconfiguration of the data privacy integration component to correct the misconfiguration.

What is claimed is:

1. A computer-implemented method comprising:

receiving, from multiple systems in a multi-system landscape, data stocktaking data regarding objects in respective systems, wherein the data stocktaking data comprises, for each respective system, a list of objects under processing in the respective system and a list of objects not under processing in the respective system;

evaluating the data stocktaking data at a central monitoring system;

determining, based on the evaluating, at least one misconfiguration of a data privacy integration component that manages data privacy integration in the multi-system landscape, wherein determining the at least one misconfiguration comprises:

determining that a number of objects in the list of objects not under processing by a first system exceeds a threshold; and determining, as the misconfiguration, that the first system is not configured as a responder for at least one object type in a data privacy integration protocol;

for each identified misconfiguration, identifying a reconfiguration of the data privacy integration component, wherein a first reconfiguration comprises reconfiguring the data privacy integration protocol so that the first system is a responder for the at least one object type for the data privacy integration protocol; and applying the reconfiguration of the data privacy integration component to correct the misconfiguration.

2. The computer-implemented method of claim 1, wherein the data stocktaking data is sent by a respective system in response to an event, wherein the event comprises a next periodic interval or a threshold number of objects having been changed in the respective system since a last sending of data stocktaking data by the respective system.

3. The computer-implemented method of claim 1, wherein data stocktaking data includes one or more of a last changed date, a predicted end-of-purpose date, or purposes assigned to objects.

4. The computer-implemented method of claim 1, wherein data stocktaking data for a respective system includes all objects stored in the respective system or objects that have had a change in status since a last sending of data stocktaking data by the respective system.

5. The computer-implemented method of claim 1, wherein data stocktaking data for a respective system includes a list of paused objects that appear to not be under processing in the respective system but are still under processing in the respective system.

6. The computer-implemented method of claim 1, wherein determining the at least one the misconfiguration comprises determining that a first object has been deleted in a first system but not in a second system.

7. The computer-implemented method of claim 1, wherein:

identifying the misconfiguration comprises determining that a first purpose has been disassociated from a first object in a first system but not in a second system based on a misconfiguration in an aligned purpose disassociation protocol; and the reconfiguration comprises reconfiguring the aligned purpose disassociation protocol to correct the misconfiguration.

8. The computer-implemented method of claim 7, wherein identifying the misconfiguration comprises determining that a first system has a purpose mapped to a first object but that the first system has not processed the first object for the first purpose in more than a threshold amount of time.

9. The computer-implemented method of claim 1, wherein determining a misconfiguration comprises automatically determining that the data stocktaking data matches at least one predefined rule.

10. The computer-implemented method of claim 9, wherein a first rule specifies that the misconfiguration occurs when a first system includes a first object having a first object identifier and a second system does not include any object with the first object identifier after a threshold amount of time after detecting the first object in the first system.

11. The computer-implemented method of claim 9, wherein a second rule specifies that the misconfiguration occurs when a first object with a first object identifier remains in a first system for more than a threshold amount of time after a second object with the first object identifier has been deleted from a second system.

12. The computer-implemented method of claim 9, wherein a third rule specifies that the misconfiguration occurs when a first system that is configured to receive data from a second system has more than a threshold different number of objects of a first object type than the second system.

13. The computer-implemented method of claim 9, wherein a fourth rule specifies that the misconfiguration occurs when a determination is made that a number of objects not under processing in a first system has increased more than a threshold amount during a time period.

14. The computer-implemented method of claim 9, wherein:

a fifth rule specifies that the misconfiguration occurs when a determination is made, after a threshold amount of time has passed since modification of first object attributes of a first object instance with a first object identifier in a first system, that second object attributes of a second object instance with the first object identifier in a second system are different than the first object attributes;

the misconfiguration is identified as a misconfiguration of an integration point used to replicate object data and associated purpose information between systems; and the reconfiguration is a reconfiguration of the integration point.

15. The computer-implemented method of claim 14, wherein determining that the second object attributes are different than the first object attributes comprises comparing a normalized and hashed version of the first object attributes to a normalized and hashed version of the second object attributes.

16. The computer-implemented method of claim 15, wherein the normalized and hashed version of the first object attributes is generated by one of the first system, a common library provided to the first system and the second system, a proxy service invoked by the first system, or a web service invoked by the first system.

17. The computer-implemented method of claim 14, wherein:
- a normalized version of object attributes is generated based on common normalization rules that specify which and how certain attribute values of an object are to be normalized before hashing of object attribute data occurs; and
- a normalized and hashed version of object attributes is generated based on applying common hashing rules to normalized object data.

18. A system comprising:
one or more computers; and
a computer-readable medium coupled to the one or more computers having instructions stored thereon which, when executed by the one or more computers, cause the one or more computers to perform operations comprising:
  receiving, from multiple systems in a multi-system landscape, data stocktaking data regarding objects in respective systems, wherein the data stocktaking data comprises, for each respective system, a list of objects under processing in the respective system and a list of objects not under processing in the respective system;
  evaluating the data stocktaking data at a central monitoring system;
  determining, based on the evaluating, at least one misconfiguration of a data privacy integration component that manages data privacy integration in the multi-system landscape, wherein determining the at least one misconfiguration comprises:
    determining that a number of objects in the list of objects not under processing by a first system exceeds a threshold; and
    determining, as the misconfiguration, that the first system is not configured as a responder for at least one object type in a data privacy integration protocol;
  for each identified misconfiguration, identifying a reconfiguration of the data privacy integration component, wherein a first reconfiguration comprises reconfiguring the data privacy integration protocol so that the first system is a responder for the at least one object type for the data privacy integration protocol; and
  applying the reconfiguration of the data privacy integration component to correct the misconfiguration.

19. A computer program product encoded on a non-transitory storage medium, the product comprising non-transitory, computer readable instructions for causing one or more processors to perform operations comprising:
  receiving, from multiple systems in a multi-system landscape, data stocktaking data regarding objects in respective systems, wherein the data stocktaking data comprises, for each respective system, a list of objects under processing in the respective system and a list of objects not under processing in the respective system;
  evaluating the data stocktaking data at a central monitoring system;
  determining, based on the evaluating, at least one misconfiguration of a data privacy integration component that manages data privacy integration in the multi-system landscape, wherein determining the at least one misconfiguration comprises:
    determining that a number of objects in the list of objects not under processing by a first system exceeds a threshold; and
    determining, as the misconfiguration, that the first system is not configured as a responder for at least one object type in a data privacy integration protocol;
  for each identified misconfiguration, identifying a reconfiguration of the data privacy integration component, wherein a first reconfiguration comprises reconfiguring the data privacy integration protocol so that the first system is a responder for the at least one object type for the data privacy integration protocol; and
  applying the reconfiguration of the data privacy integration component to correct the misconfiguration.

\* \* \* \* \*